(12) United States Patent
Dugosh

(10) Patent No.: US 11,291,259 B1
(45) Date of Patent: Apr. 5, 2022

(54) ATTACHABLE DECORATIVE MEDALLION FOR CAP

(71) Applicant: James A. Dugosh, Myrtle Beach, SC (US)

(72) Inventor: James A. Dugosh, Myrtle Beach, SC (US)

( * ) Notice: Subject to any disclaimer, the term of this patent is extended or adjusted under 35 U.S.C. 154(b) by 0 days.

(21) Appl. No.: 17/357,880

(22) Filed: Jun. 24, 2021

Related U.S. Application Data

(60) Provisional application No. 63/043,428, filed on Jun. 24, 2020.

(51) Int. Cl.
| | |
|---|---|
| *A42B 1/248* | (2021.01) |
| *F21V 5/04* | (2006.01) |
| *F21V 23/00* | (2015.01) |
| *F21V 8/00* | (2006.01) |
| *F21Y 113/10* | (2016.01) |
| *F21Y 115/10* | (2016.01) |

(52) U.S. Cl.
CPC ............... *A42B 1/248* (2013.01); *F21V 5/04* (2013.01); *F21V 23/003* (2013.01); *G02B 6/0008* (2013.01); *F21Y 2113/10* (2016.08); *F21Y 2115/10* (2016.08)

(58) Field of Classification Search
CPC ......... A42B 1/248; F21V 5/04; F21V 23/003; G02B 6/0008
USPC ......................................................... 362/555
See application file for complete search history.

(56) References Cited

U.S. PATENT DOCUMENTS

| | | | |
|---|---|---|---|
| 956,817 A * | 5/1910 | Morscher | F21V 21/084 |
| 5,282,278 A | 2/1994 | Miner | |
| 5,499,402 A | 3/1996 | Rose | |
| 5,517,695 A | 5/1996 | Murray | |
| 5,549,940 A | 8/1996 | Noone | |
| D373,454 S | 9/1996 | Ramirez | |
| 5,600,855 A | 2/1997 | Ramirez | |
| 5,632,047 A | 5/1997 | Van Den Heuvel | |
| 5,950,242 A | 9/1999 | Mahoney | |
| 6,006,362 A | 12/1999 | Walsh | |
| 6,175,963 B1 | 1/2001 | Loeffelholz | |
| 9,609,902 B2 * | 4/2017 | Waters | A42B 1/244 |
| 9,872,530 B2 * | 1/2018 | Waters | A42B 3/044 |
| 10,159,294 B2 * | 12/2018 | Waters | A42B 1/242 |
| 10,939,717 B2 * | 3/2021 | Shepherd | A42B 1/244 |
| 1,098,030 A1 * | 4/2021 | Volmer | F21L 4/04 |
| 2006/0023049 A1 * | 10/2006 | Thompson | A42B 1/002 |
| 2009/0119819 A1 * | 5/2009 | Thompson | A42B 1/0182 |
| 2013/0132961 A1 * | 8/2013 | Waters | F21V 5/04 |
| 2021/0345718 A1 * | 11/2021 | Moore | |

* cited by examiner

*Primary Examiner* — Bryon T Gyllstrom
(74) *Attorney, Agent, or Firm* — P. Jeff Martin; The Law Firm of P. Jeffrey Martin, LLC

(57) ABSTRACT

A decorative attachment for baseball-style caps includes a plate having a planar body foldable to an arcuate configuration. The plate is detachably secured to the headband size-regulator strap of the cap via a coupling means. The decorative attachment further includes a plate cover embellished with indicia which includes a variety of visual representations such as letters, words, phrases, numbers, formula or formulae, symbols, designs, badges, colors, devices, trademarks, logos, and ornamental elements associated with a particular theme.

20 Claims, 22 Drawing Sheets ize: 12px;">

ATTACHABLE DECORATIVE MEDALLION FOR CAP

I. RELATED APPLICATIONS

This application claims priority to U.S. Provisional Patent Application No. 63/043,428, filed on Jun. 24, 2020, the disclosure of which is hereby incorporated by reference in its entirety.

II. FIELD OF THE INVENTION

The present application discloses and describes an apparatus and/or system for a decorative medal or medallion attachable to the rear of a cap opening formed along the adjustable headband size-regulator (slider).

III. MOTIVATION OF THE INVENTOR

Many attempts have been made to provide improved decorative attachments for hats and caps. For example, though not an exhaustive recitation of all attempts, these include:
U.S. Pat. No. 5,282,278, issued in the name of Miner;
U.S. Pat. No. 5,632,047, issued in the name of Van Den Heuvel;
U.S. Pat. No. 5,517,695, issued in the name of Murray;
U.S. Pat. No. 6,006,362, issued in the name of Walsh;
U.S. Pat. No. 5,950,242, issued in the name of Mahoney;
U.S. Pat. No. 5,499,402, issued in the name of Rose;
U.S. Pat. No. 5,600,855, issued in the name of Ramirez;
U.S. Pat. No. 6,175,963 B1 issued in the name of Loeffelholz;
U.S. Pat. No. D373,454, issued in the name of Ramirez; and
U.S. Pat. No. 5,549,940, issued in the name of Noone.

Despite these numerous attempts, there is still a need and desire for improved techniques and systems for decorative attachments for hats and caps.

IV. SUMMARY OF THE INVENTION

In one embodiment, a decorative attachment for caps is disclosed. The decorative attachment comprises a plate and a coupling means for mutually coupling the plate to the rear section of a baseball-style cap.

In accordance to one embodiment, the plate comprises a planar body having a first arcuate portion and a second arcuate portion. The first arcuate portion has an obverse surface opposing a reverse surface. Similarly, the second arcuate portion has an obverse surface and reverse surface. The first arcuate portion and second arcuate portion are integrally coupled via an interface, the interface defining a fold line for folding and for removably coupling (attaching and detaching as desired) the first arcuate portion and the second arcuate portion in an appositionally orientation that is achieved via the coupling means. The interface is flanked by first and second notches or voids.

In order to removably attach the present invention to a cap, the fold line of the plate is aligned with the headband size-regulator strap or slider for folding the first arcuate portion and the second arcuate portion thereabout and mutually coupling the reverse surface of the first arcuate portion with the reverse surface of the second arcuate portion. It is envisioned that the obverse surface(s) of the first arcuate and/or second arcuate portion(s) may be disposed with indicia. Indicia may include and/or comprise a variety of visual representations, including letters, words, phrases, numbers, formula or formulae, symbols, designs, badges, colors, devices, and the spectrum of trademarks available for licensing and use, including characters, likenesses, and similar configurations.

In accordance to another embodiment, indicia may be formed on a separate, removably attachable and detachable plate cover. The plate cover comprises an interchangeable, decorative planar body comprising an arcuate or semicircular configuration and includes an obverse surface and a reverse surface, the obverse surface of the decorative planar body is embellished with indicia. The decorative planar body is removably coupled to the obverse surface of the first arcuate portion and/or the obverse surface of the second arcuate portion via a fastening means, such as a hook-and-loop fastener.

V. BRIEF DESCRIPTION OF THE DRAWING(S)

The advantages and features of the present invention will become better understood with reference to the following more detailed description and claims taken in conjunction with the accompanying drawings, in which like elements are identified with like symbols, and in which:

VI. DESCRIPTION OF THE EMBODIMENT(S)

Figure 1:
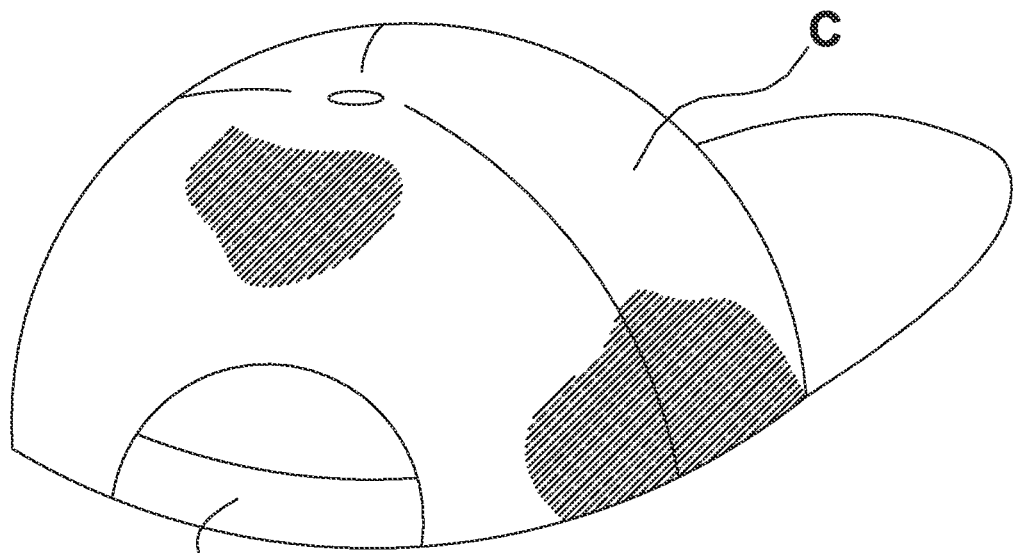
FIG. 1 depicts a right, rear perspective view of an exemplary conventional adjustable baseball-style cap.
Figure 2:
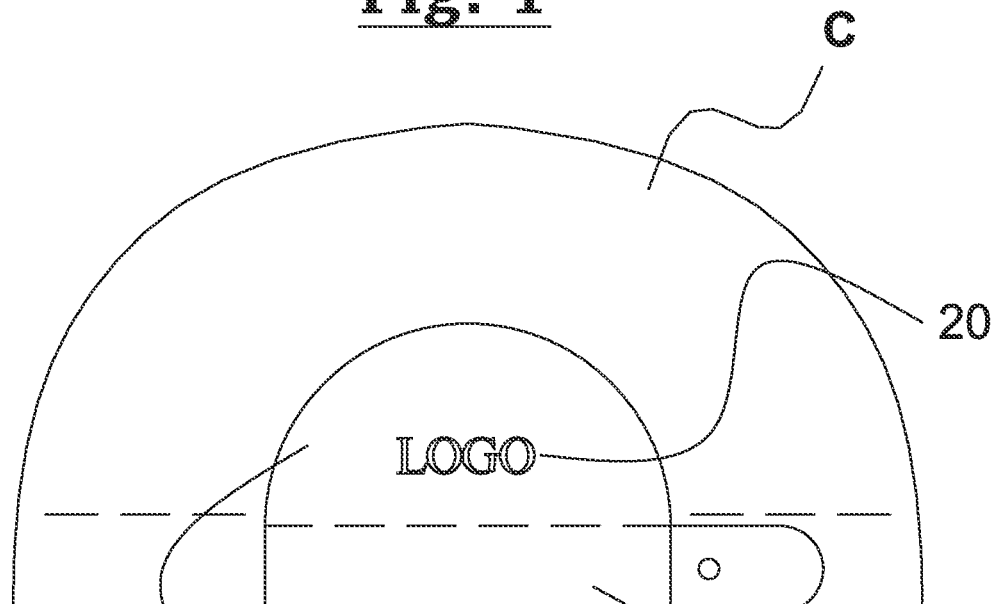
FIG. 2 is a rear view of a conventional baseball-style cap showing the decorative attachment detachably secured thereto, in accordance to one embodiment of the present invention.
Figure 3:
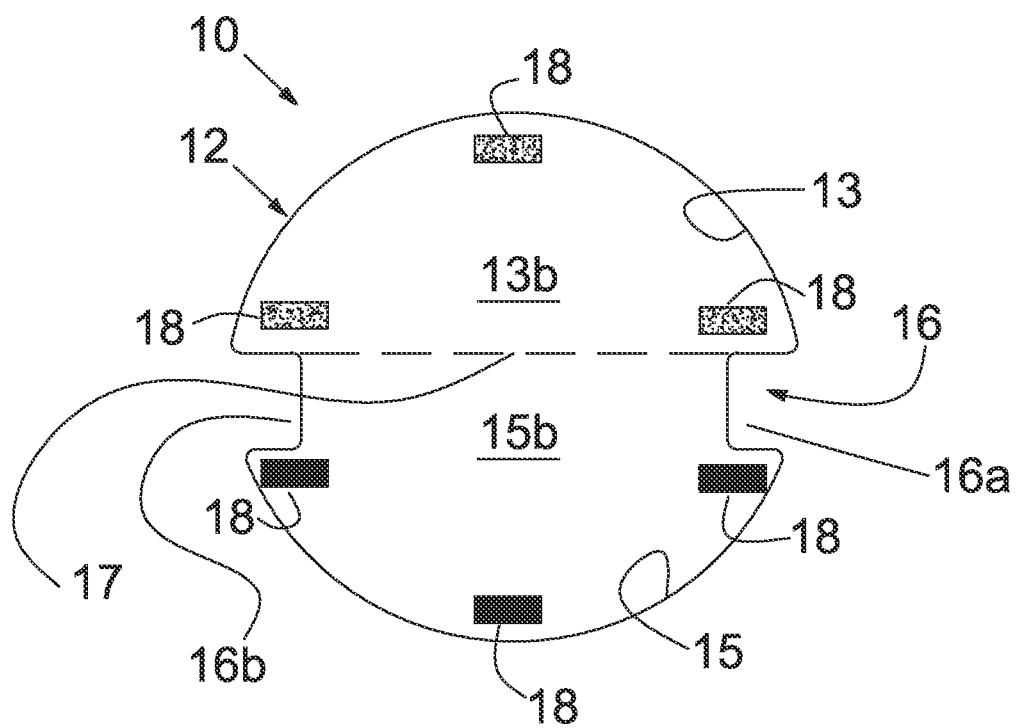
FIG. 3 is a bottom plan view of the plate of the decorative attachment, in accordance to one embodiment of the present invention.
Figure 4:
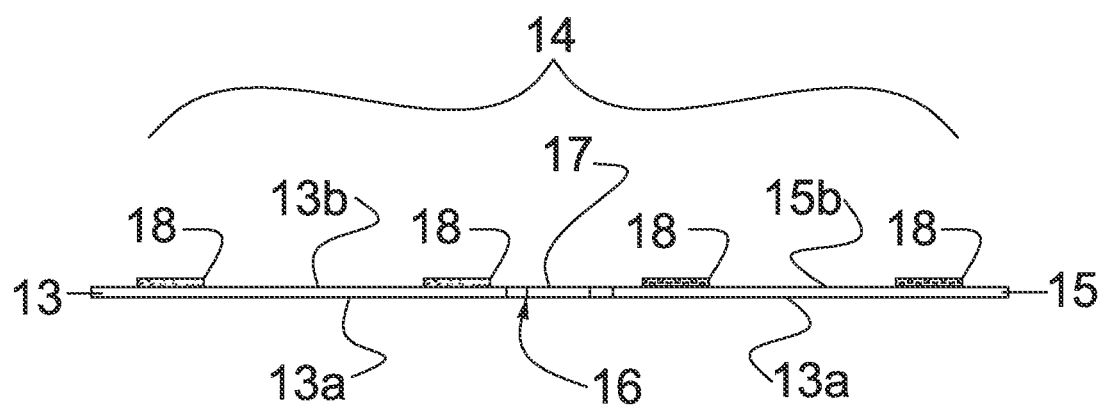
FIG. 4 is a side elevational view of the plate in FIG. 3.
Figure 3A:
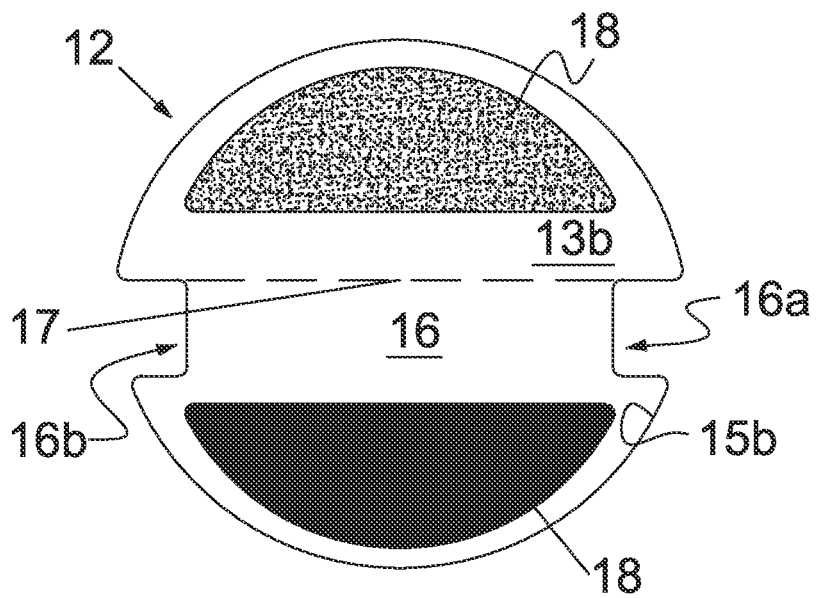
FIG. 3a is a bottom plan view of the plate of the decorative attachment, in accordance to another embodiment of the present invention.
Figure 3B:
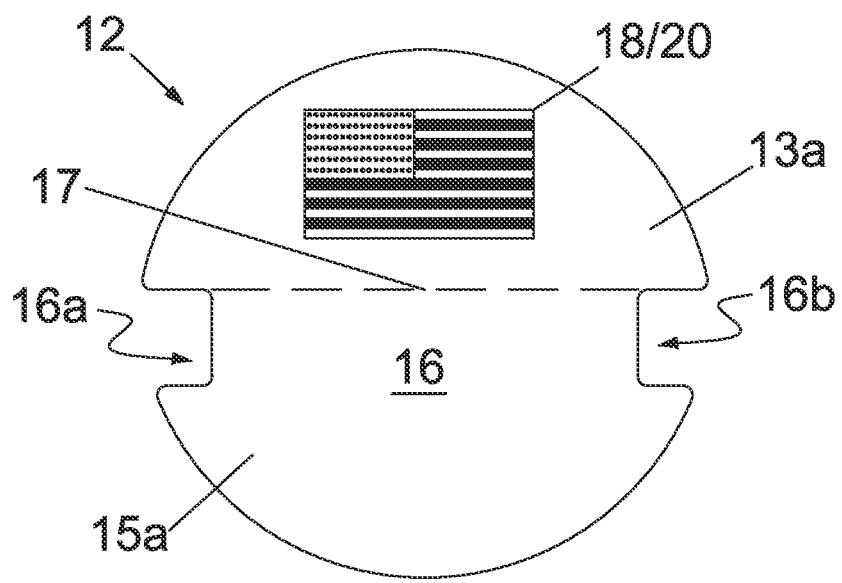
FIG. 3b is a top plan view of the plate of the decorative attachment, in accordance to another embodiment of the present invention.
Figure 3C:
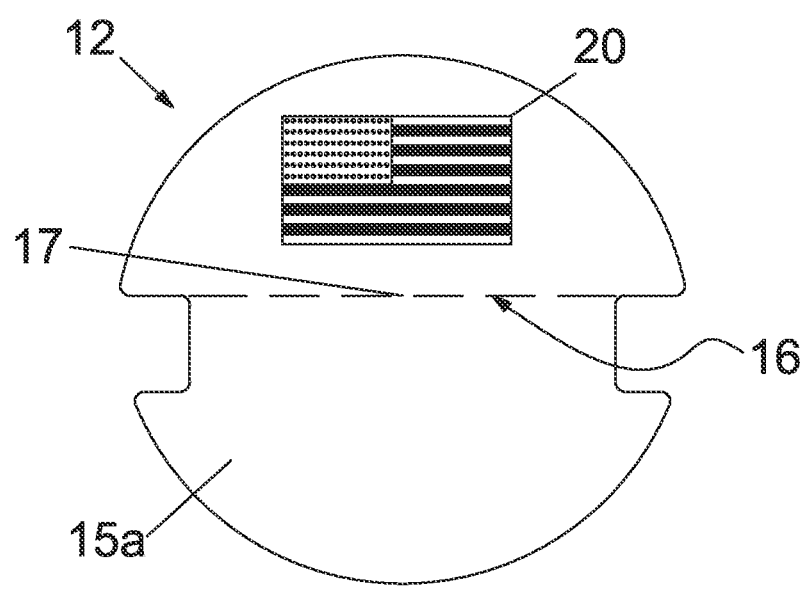
FIG. 3c is a top plan view of the plate of the decorative attachment, in accordance to another embodiment of the present invention.
Figure 3D:
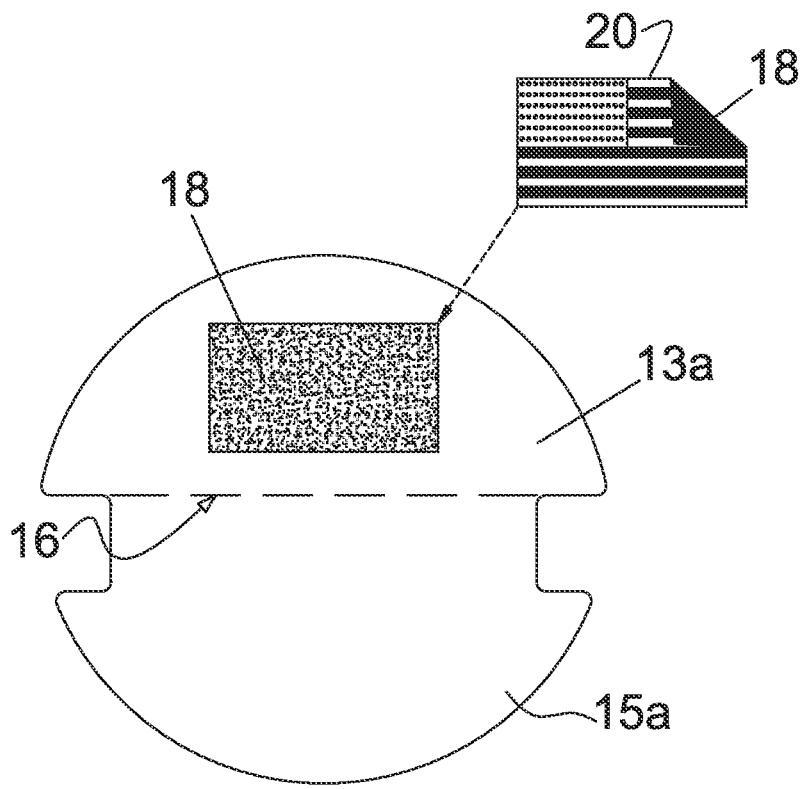
FIG. 3d is an exploded, top plan view of the plate of the decorative attachment, in accordance to one embodiment of the present invention.
Figure 3E:
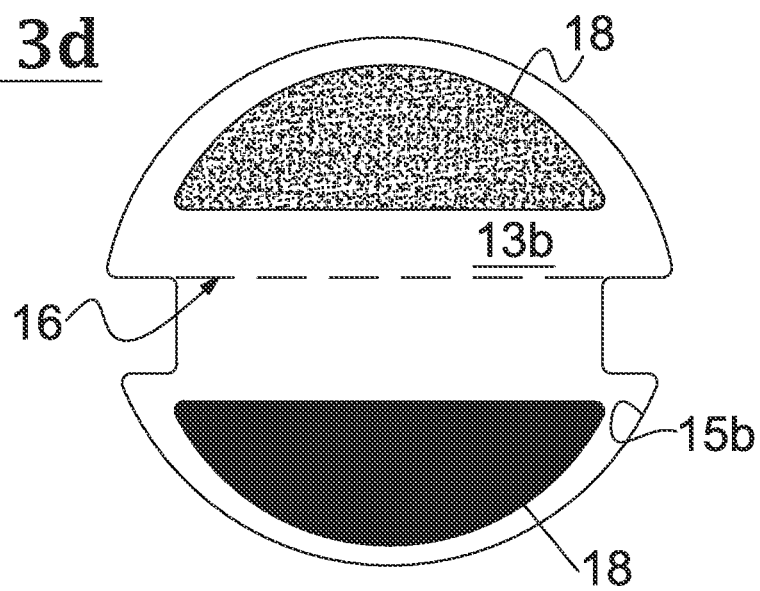
FIG. 3e is a bottom plan view of the plate of the decorative attachment, in accordance to another embodiment of the present invention.
Figure 7:
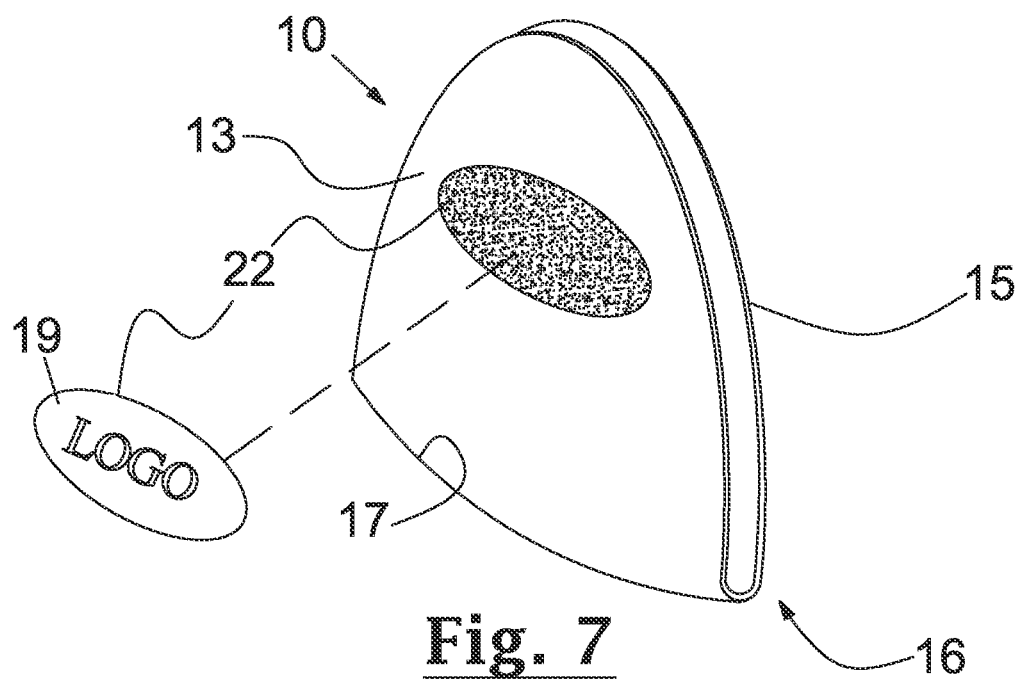
FIG. 7 is a left, front perspective view of another embodiment of the present invention.
Figure 8:
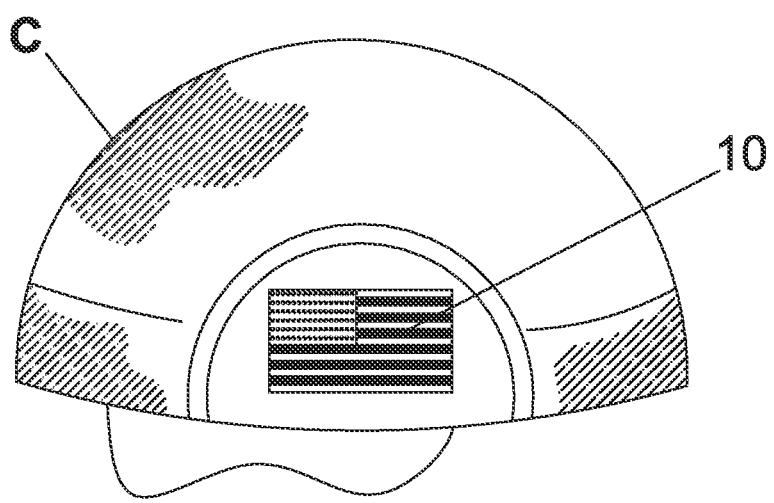
FIG. 8 is a left, rear perspective view of the decorative attachment shown in-use, in accordance to one embodiment of the present invention.

Consistent with FIGS. 2-6, as well as an alternate embodiment in FIGS. 7 and 8, a decorative attachment 10 for caps C is described and disclosed. The attachment 10 comprises a plate 12, having a planar body 14, and coupling means 18 for mutually coupling portions (13, 15) of the planar body 14 to form the attachment 10 placed at the rear of a baseball-style cap C in the space defined by the headband size-regulator strap or slider (denoted by Str in a representation of a prior art cap C of FIG. 1).

As indicated in FIGS. 2-8, the attachment 10 comprises a plate 12 comprising a planar body 14. The planar body 14 comprises a first arcuate portion 13 and a second arcuate portion 15. The first arcuate portion 13 has an obverse surface 13a opposing a reverse surface 13b. Similarly, the second arcuate portion 15 has an obverse surface 15a and a reverse surface 15b. The first arcuate portion 13 and second arcuate portion 15 are integrally coupled via an interface 16, the interface 16 defining a fold line 17 for folding and for removably coupling (attaching and detaching as desired) the first arcuate portion 13 and the second arcuate portion 15 in an appositionally orientation that is achieved via coupling means 18. The interface 16 is flanked by first and second notches 16a and 16b or voids.

Coupling means 18 is disposed on the reverse surface 13b of the first arcuate portion 13 and the reverse surface 15b of the second arcuate portion 15. Accordingly, coupling means 18 mutually couples the first arcuate portion 13 and the second arcuate portion 15 along the reverse surfaces (13b, 15b) thereof through the conjoining and/or coupling of complementary elements selected for use as coupling means 18.

The fold line 17 is aligned with the headband size-regulator strap Str for folding the first arcuate portion 13 and the second arcuate portion 15 about the headband size-regulator strap Str and mutually coupling the reverse surface 13b of the first arcuate portion 13 with the reverse surface 15b of the second arcuate portion 15.

Figure 5:
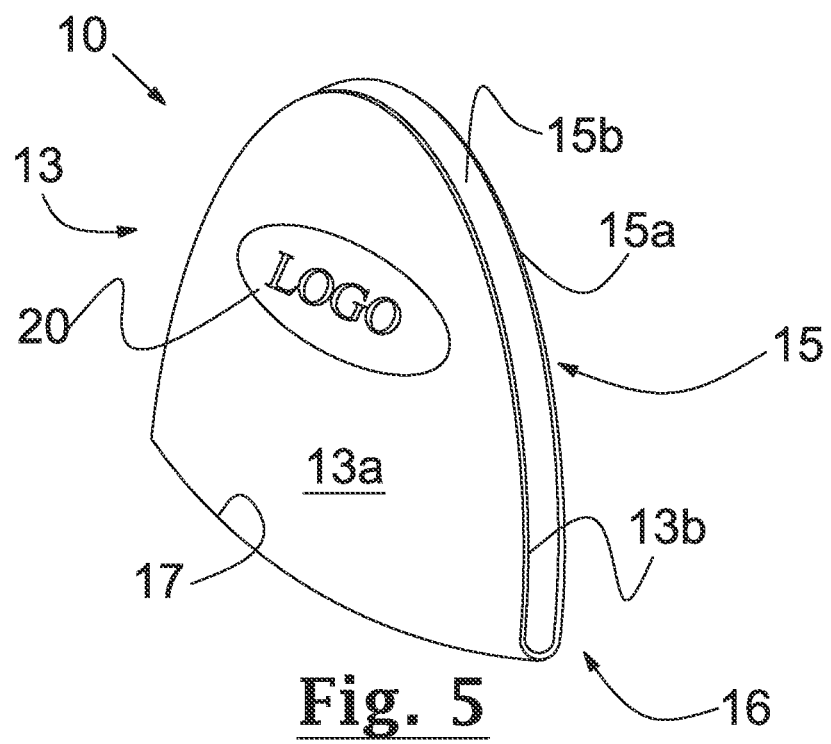
FIG. 5 is a left, front perspective view of the plate of the decorative attachment shown in a folded configuration, in accordance to one embodiment of the present invention.
Figure 5A:
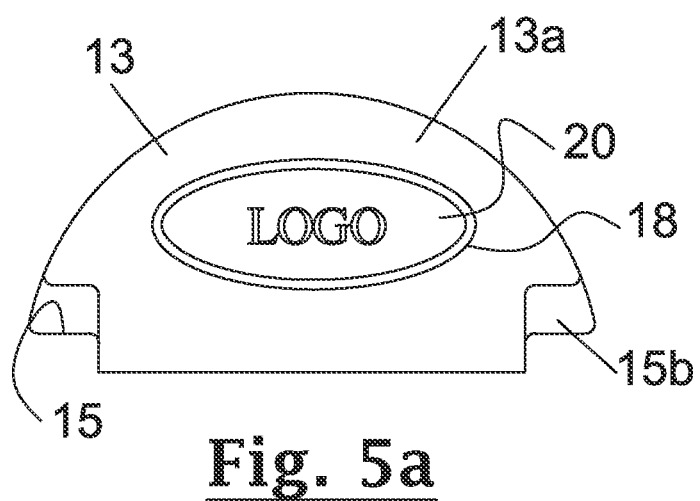
FIG. 5a is a front, elevational view of the plate of the decorative attachment shown in a folded configuration, in accordance to another embodiment of the present invention.
Figure 6:
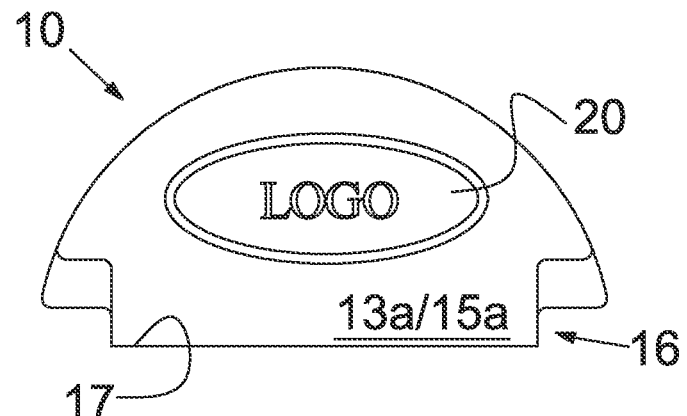
FIG. 6 is a front view showing the surface of an arcuate portion embellished with indicia, in accordance to one embodiment of the present invention.
Figure 6A:
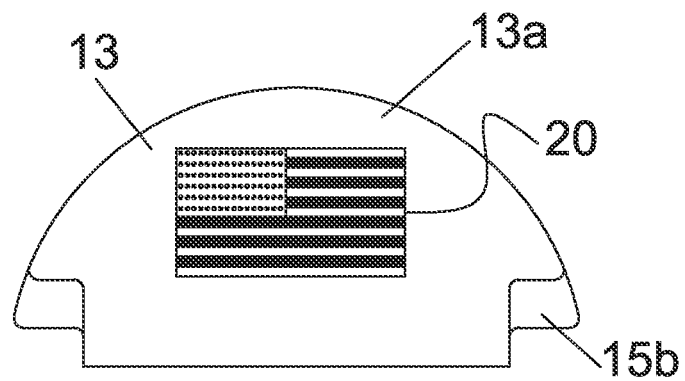
FIG. 6a is a front view showing the obverse surface of a first arcuate portion embellished with indicia, in accordance to another embodiment of the present invention.
Figure 6B:
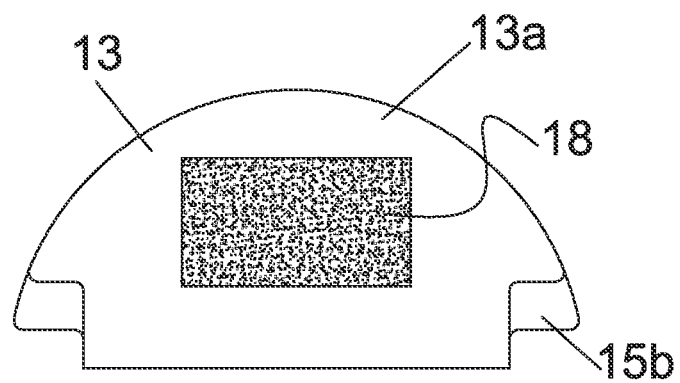
FIG. 6b is a front view of the obverse surface of the first arcuate portion in FIG. 6a shown with the indicia removed.

Consistent with FIG. 5, generally, it is envisioned that the obverse surface(s) 13a (and/or 15a) of the first 13 and/or second 15 portion(s) may include indicia 20. The indicia 20 may be formed integral to the obverse surface(s) (13a and/or 15a) or permanently applied to the obverse surface(s) (13a and/or 15a) via sewing, an adhesive or any other suitable method or means of bonding. In another embodiment consistent with FIG. 7, it is envisioned that the indicia 20 may be formed on a separate, removably attachable member, herein denoted as a plate cover 19.

Referring now to the embodiment depicted in FIG. 7, the plate cover 19 comprises an interchangeable, decorative planar body 19c comprising an arcuate or semicircular configuration and includes an obverse surface 19a and a reverse surface 19b, the obverse surface 19a of the decorative planar body 19 is embellished with indicia 20. The decorative planar body 19 is removably coupled to the obverse surface 13a of the first arcuate portion 13 and/or the obverse surface 15a of the second arcuate portion 15a. The removable coupling accomplished via a fastening means 22.

Regardless of the integral or applied nature of the visual representation(s), indicia 20 may include and/or comprise a variety of visual representations, including letters, words, phrases, numbers, formula, symbols, designs, badges, colors, devices, and the spectrum of trademarks available for licensing and use, including characters, likenesses, and similar configurations. As contemplated, the indicia 20 forms part of a visible obverse surface from which other individuals may perceive or observe the indicia 20 from the rear opening of a conventional or standard baseball cap C; although it is contemplated that individuals also occasionally wear such caps/hats C in reverse, with the bill facing the rear and the opening adjacent the wearer's face, thus causing the observation of the indicia 20 to project from the front and adjacent the user's face rather than spine).

Indicia 20 may further comprise ornamental elements which reflect, exemplify, or are otherwise associated with a particular theme. For purposes of this disclosure, "theme" is broadly construed to comprise the following: a variety of holidays and symbols therefor, such as Christmas, Thanksgiving, Fourth of July, Easter, New Years, Halloween, and the like; corporate/company advertising; political campaigns; charitable fund raising campaigns; geographical locations, formations, and objects, such as plant and tree life, a lighthouse, a tropical scene, a snowy-winter scene, or a rain forest; nautical or aquatic scenes which include aquatic life such as fish, whales, sharks, and dolphins; wild and exotic animals; domestic animals, such as an image of one's pet(s); secular or religious holidays indicia and symbols therefor; humorous indicia and images; sports, including motor sports and sports symbols and logos therefor; sports equipment, sports venues, symbols, and teams; prehistoric reptiles; cartoon characters; outer space and objects representative thereof, such as celestial images, stars, moon, planets and the like; military service symbols representative of each branch thereof, including symbols and designs representing military service decorations, medals, and the like, cultural images and symbols representative thereof, such as Southwestern and tribal cultures; family photos; and any other images selectively desired by user.

Coupling means 18 is utilized for coupling and joining the first arcuate portion 13 and the second arcuate portion 15, and is achieved using one or more elements. These elements may include singularly or in combination buttons, studs, toggles, eyelets, buckles, zippers, snap fasteners, hook-and-loop fastener material 18a, magnets, and grommets.

Fastening means 22 is utilized for coupling separately attachable indicia 20 to the obverse surface (13a and/or 15a) of the arcuate portions (13 and/or 15). Similar to coupling means 18, fastening means 22 may include one or more elements. Included among the elements are buttons, studs, toggles, eyelets, buckles, zippers, snap fasteners, hook-and-loop fastener material 22a, magnets, and grommets.

Figure 9:
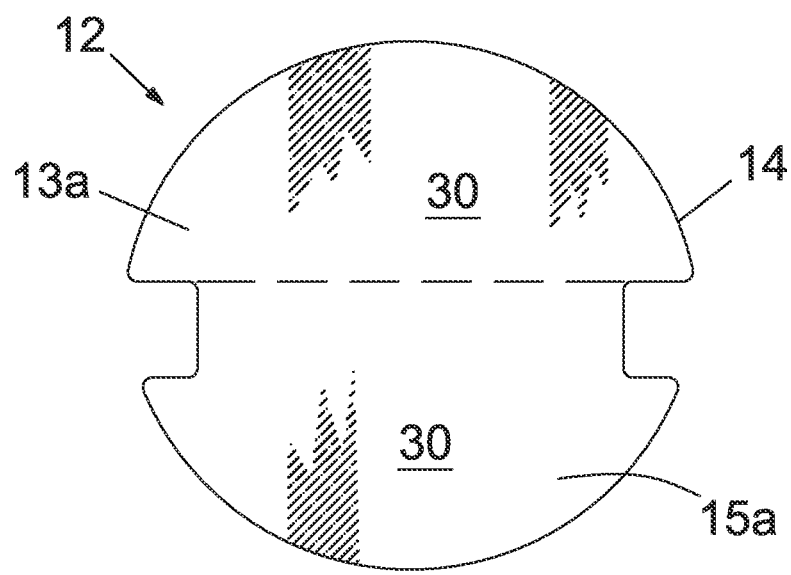
FIG. 9 is a top plan view of a reflective plate, in accordance to one embodiment of the present invention.

Referring now more particularly to FIG. 9, in order to impart a high level of visibility to the decorative attachment 10 under low-light conditions, such as at dusk, night-time or in a darkened area with limited visibility, thus maximizing visibility of the wearer of the decorative attachment 10 from an adequate safety distance during such low-light conditions, the planar body 14 of plate 12 comprises a light reflective material 30 or substance. The light reflective material 30 may be coated, sprayed, painted, impressed, integrated, or applied via sewing or an adhesive superjacent at least one of the obverse surface 13a of the first arcuate portion 13, the obverse surface 15a of the second arcuate portion 15, the reverse surface 13b of the first arcuate portion 13, and the reverse surface 15b of the second arcuate portion 15. The light reflective material 30 is adapted and configured to reflect ambient light or light emitted or directed from a light emission source (such as automotive or motorcycle headlights, or a flashlight) in order to provide a visual warning to approaching and advancing persons of the presence of another person located in the proximate vicinity.

Figure 10:
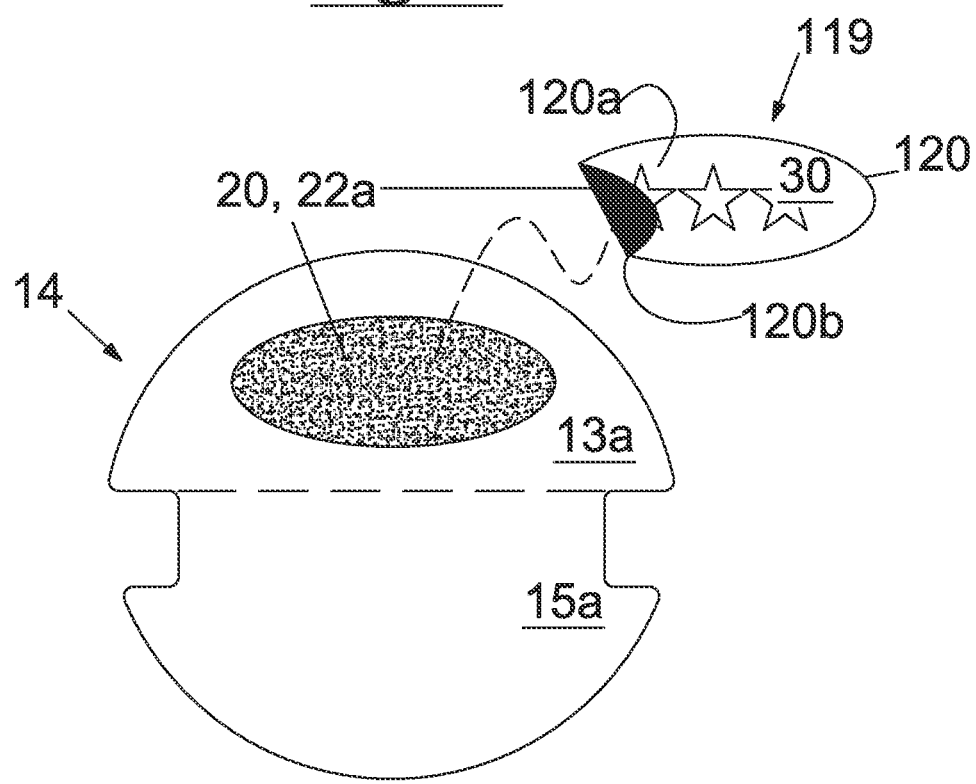
FIG. 10 is an exploded view showing a reflective patch removably coupled to the obverse surface of the first arcuate portion of the planar body of the plate, in accordance to another embodiment of the present invention.

Referring now to FIG. 10, in accordance to another embodiment, a reflective patch 119 is disclosed. The reflective patch 119 comprises a flexible, planar body 120 and includes an obverse surface 120a and a reverse surface 120b. Consistent with the reflective planar body 14, the reflective patch 119 comprises a light reflective material 30 or substance. The light reflective material 30 may be coated, sprayed, painted, impressed, integrated, or applied via sewing or an adhesive superjacent the obverse surface 120a and/or the reverse surface 120b of the planar body 120. The flexible, planar body 120 may comprise a rectangular configuration (as depicted in FIG. 10), or other geometric shapes and configurations, such as including, but not limited to, square, triangular, parallelogram, trapezium, arcuate or semicircular, and rhombus.

Preferably, the planar body 120 is removably coupled to the obverse surface 13a of the first arcuate portion 13 and/or the obverse surface 15a of the second arcuate portion 15a of the planar body 14 of the plate 12. Removable coupling of the reflective patch 119 to at least one of the obverse surface 13a of the first arcuate portion 13 and the obverse surface 15a of the second arcuate portion 15a of the planar body 14 is accomplished via the fastening means 22, such as a hook-and-loop fastener material 22a. The reverse surface 120b of planar body 120 comprises a complementary fastening portion 22a for mutual cooperation with fastening means 22, 22a affixed to the obverse surface 13a of the first arcuate portion 13 and/or the obverse surface 15a of the second arcuate portion 15a to facilitate mutual coupling of the reflective patch 119 to the obverse surface 13a of the first arcuate portion 13 and/or the obverse surface 15a of the second arcuate portion 15a of the planar body 14.

Alternatively, the planar body 120 may be permanently affixed to the obverse surface 13a of the first arcuate portion 13 and/or the obverse surface 15a of the second arcuate portion 15a of the planar body 14 of the plate 12 via a suitable attachment means, such as including, but not limited to, sewing, and an adhesive.

The obverse surface 120a of the planar body 120 may embellished with indicia 20, as previously described, thereby providing an interchangeable, decorative planar body 120.

Figure 11:
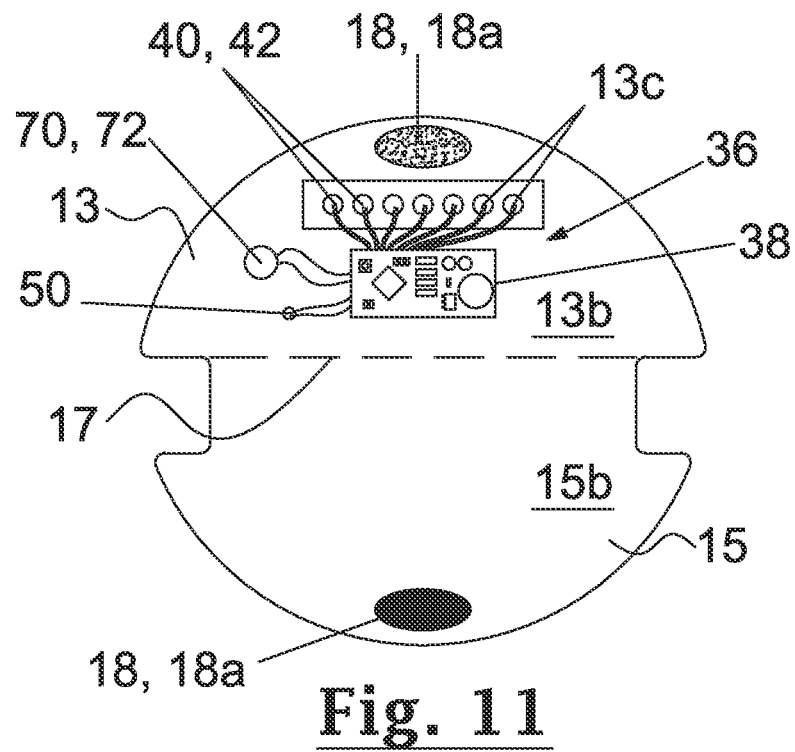
FIG. 11 is a bottom plan view of the plate of the decorative attachment, in accordance to another embodiment of the present invention.
Figure 11A:
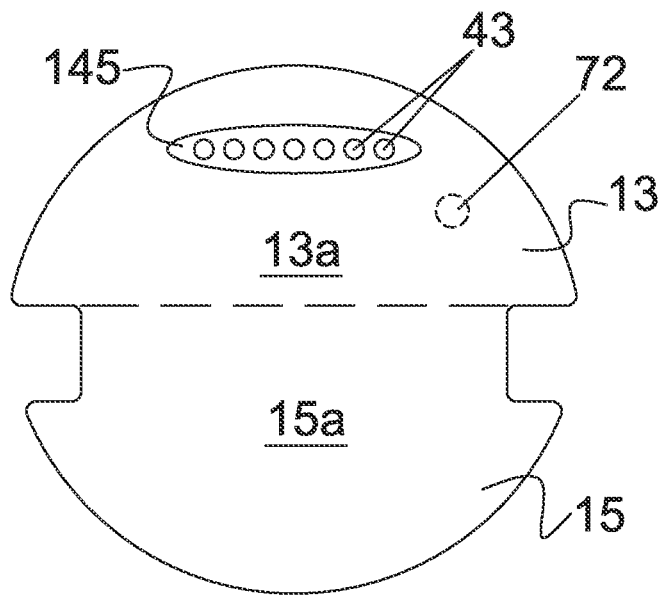
FIG. 11a is a top plan view of the plate illustrated in FIG. 11.
Figure 11B:
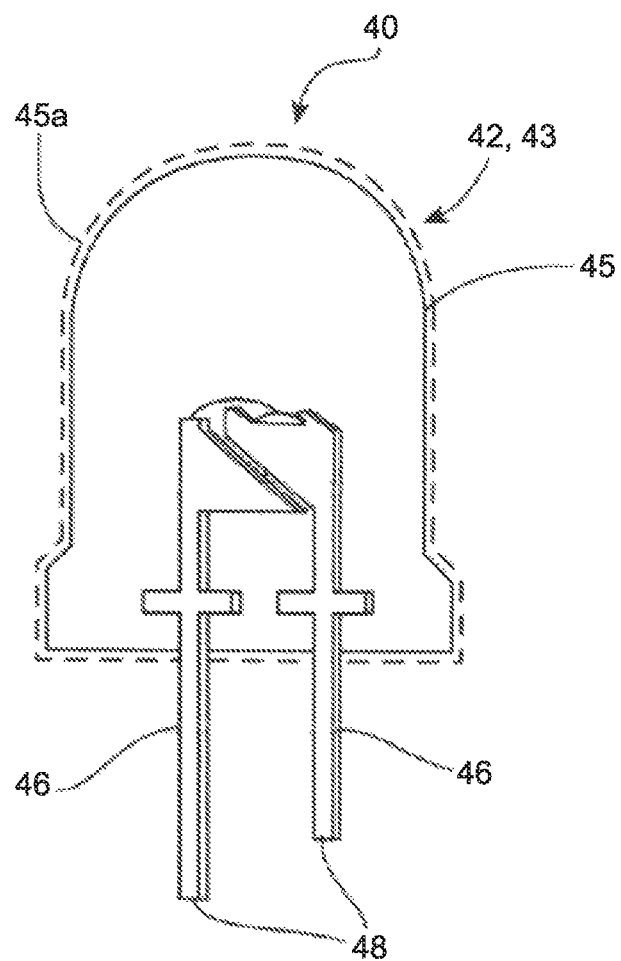
FIG. 11b is a side elevational view of an exemplary light source depicted as a light emitting diode, in accordance to one embodiment of the present invention.
Figure 11C:
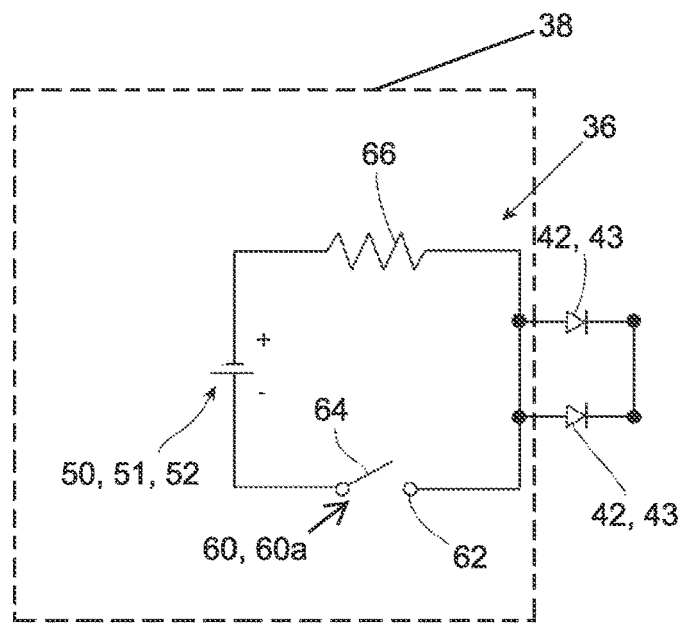
FIG. 11c is a schematic diagram of an exemplary electrical circuit used to project narrow beams of light forwardly, in accordance to one embodiment of the present invention.
Figure 11D:
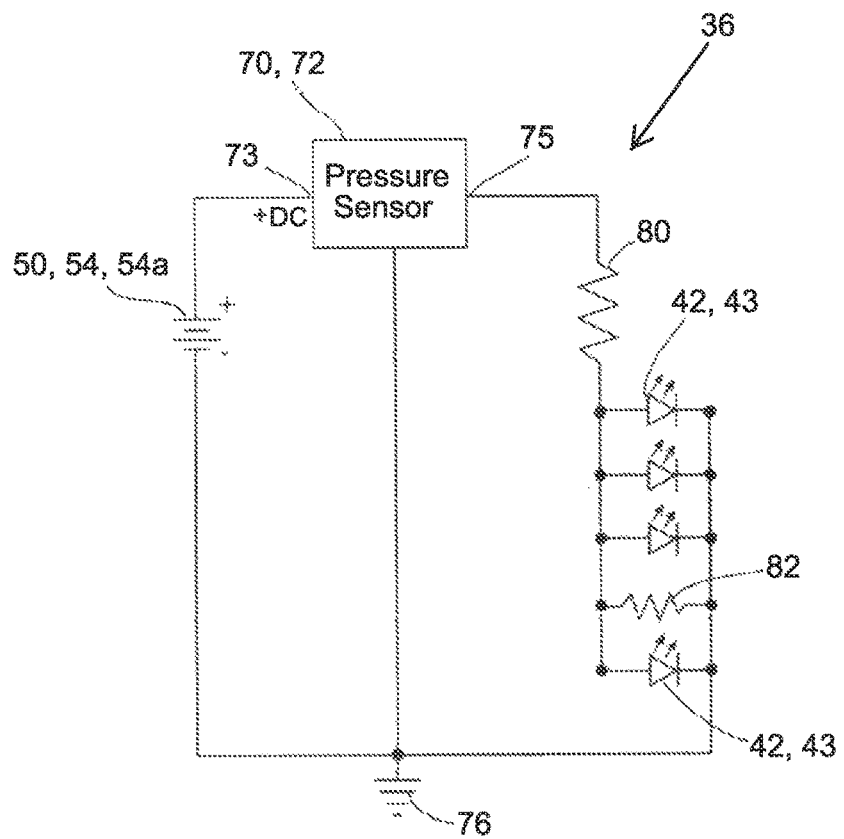
FIG. 11d is a schematic diagram of an exemplary electrical circuit used to project narrow beams of light forwardly, in accordance to another embodiment of the present invention.
Figure 11E:
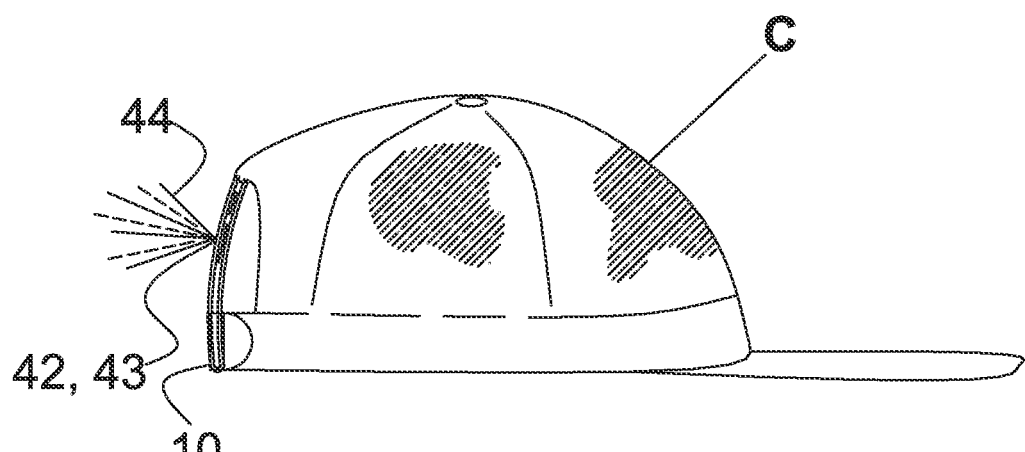
FIG. 11e is a side elevational view of a baseball style cap shown with the decorative attachment of the present invention removably attached thereto, and depicting narrow beams of light projecting forwardly from the decorative attachment, in accordance to one embodiment of the present invention.

Referring now more particularly to FIGS. 11-11e, a light source 40 is provided for projecting narrow beams 44 of light forwardly from an upper section of the obverse surface 13a of the first arcuate portion 13 of the planar body 14 and distally therefrom forming a wide flood or spill. The light source 40 is preferably high-intensity lights or one or more light emitting diodes (LEDs) 42, and more specifically, high-intensity white LEDs 43. The LEDs 43 may each comprise a transparent or translucent semi-prolate shaped lens 45.

In accordance to the embodiment illustrated in FIGS. 11 and 11a, the light source 40 is disposed along an upper section of the reverse surface 13b of the first arcuate portion 13 of the planar body 14. The light source 40 may be affixed to the reverse surface 13b via a suitable adhesive. The light source 40 is powered via a power source 50 operably connected electrically to an electrical circuit 36 mounted on a circuit board 38, such as a printed circuit board. The electrical circuit 36 is mounted generally along an upper section of the reverse surface 13b of the first arcuate portion 13 of the planar body 14. The electrical circuit 36, light source 40, and associated electrical components are powered using the power source 50 comprising one or more removable and replaceable direct current (DC) batteries 51, such as a coin cell battery 52, a button cell battery, or one or more removable and rechargeable batteries 54, such as a lithium-ion coin cell battery 54a. The power source 50 supplies voltage in the range of approximately 1.5V to 9.0V. Non-exclusive examples of rechargeable lithium-ion batteries that can be used with the teachings herein include lithium thionyl chloride, lithium manganese oxide batteries, iron disulfide, carbon monofluoride, and the like. Those possessing ordinary skill in the art can readily select an appropriate power source that is compatible with the power requirements of the selected means for activating illumination of the light source 40.

In reference to the schematic diagram in FIG. 11c, the light source 40 comprises a plurality of LEDs 43 connected electrically in parallel, wherein each of the LEDs 43 includes a pair of leads 46 terminating into contacts 48 (shown in FIG. 11b) connected electrically to the electrical circuit 36 mounted on the circuit board 38, and wherein the plurality of LEDs 43 is securely arranged along the upper section of the reverse surface 13b of the first arcuate portion 13, as depicted in FIG. 11. The lens 45 portion of each of the plurality of LEDs 43 extends perpendicularly through a lens receiving aperture 13c defined through the upper section of the first arcuate portion 13 so as to be visible from the obverse surface 13a of the first arcuate portion 13, as shown in FIG. 11a. The lens 45 of the plurality of LEDs 43 may be shielded or protected by a transparent cover disposed superjacent the obverse surface 13a. The transparent cover 145 is depicted in FIG. 11a as oval-shaped; however, the transparent cover 145 may comprise other geometric shapes. The number of lens receiving apertures 13c are equal in number to the number of LEDs 43, and wherein the lens receiving apertures 13c may be horizontally-oriented, spatially in series, in accordance to one embodiment.

However, it is clearly envisioned, alternatively the plurality of LEDs 43 may be connected electrically in series.

Several different configurations of electrical circuits that interconnect the components and electrical circuitry of the light source 40 are possible, depending upon the desired operation and end result. For example, the electrical circuit 36 may be configured so that the LEDs 42, 43 flash intermittently when the light source 40 is powered on. Alternatively, the electrical circuit 36 may be configured so that the LEDs 42, 43 remain illuminated for a brief period or remain illuminated until the light source 40 is powered off. The electrical circuitry to accomplish either of these ends or operations is well known by persons of ordinary skill in the art.

Referring now to FIG. 11c, and in accordance to one embodiment, the electrical circuit 36 comprises a switch 60 in the form of a push-button or depressible switch 60a, the switch 60 selectively interconnects the power source 50 and the light source 40, and wherein switch 60 being normally open. The switch 60 comprises a first contact 62 and a second contact 64. Upon depression of the switch 60, the second contact 64 contacts the first contact 62, thereby closing the switch 60, which enables or closes the electrical circuit 36 and turns on or powers the LEDs 43 actuating illumination thereof. Subsequent depression of the switch 60 disengages contact by the second contact 64 with the first contact 62, which opens the electrical circuit 36 and turns off or powers off the LEDs 43 preventing illumination thereof. As depicted in FIG. 11c, the electrical circuitry 36 includes a resistor 66 in series connection with the LEDs 43, the resistor 66 connected electrically between the power source 50 (voltage output) and the first LED 43 of the plurality of LEDs 43.

Referring now to FIG. 11d, in accordance to one embodiment, a pressure sensor 70 configured for enabling the electrical circuit 36 to activate illumination of the light source 40 is depicted. The pressure sensor 70 is configured to sense pressure applied thereagainst by the user's finger. The pressure sensor 70 is mounted to the circuit board 39 via wiring, or contacts, and is in electrical communication with the electrical circuit 38. The pressure sensor 70 functioning as a switch 72, wherein the switch 72 being normally open. The pressure sensor 70 is electrically coupled to the power source 50, the power source 50 passes DC voltage from the positive terminal thereof to pressure sensor 70 at input 73 of pressure sensor 70. The pressure sensor 70 has an output 75 from which current flows, the output 75 connected electrically to the at least one LED 42, 43 or preferably, the plurality of LEDs 42, 43. The pressure sensor 70 is connected to ground at ground point 76. The negative terminal of the power source 50 is connected to the ground connection 76 of pressure sensor 70, thereby providing a return path. When pressure is detected by the pressure sensor 70, its voltage output increases actuating the pressure sensor 70 to close, thereby enabling current to pass from the sensor 70 at output 75 thereof and to the plurality of LEDs 42, 43 which energizes the plurality of LEDs 42, 43, and actuates illumination thereof.

The electrical circuit 36 may include at least one resistor 80 in a series connection with the plurality of LEDs 42, 43. The at least one resistor 80 may be further defined as a variable resistor. In reference to the electrical circuit 36 shown in FIG. 11d, a first resistor 80 is connected between the output 75 of pressure sensor 70 and the first LED 42, 43 of the plurality of LEDs 42, 43, and a second resistor 82 is connected between the next-to-last LED 42, 43 and the last LED 42, 43 of the plurality of LEDs 42, 43. While the electrical circuit 36 in FIG. 11d illustrates the use of two resistors 80 and 82, the electrical circuit 36 may comprise a single resistor connected at any position between the first LED 42, 43 and the last LED 42, 43 of the plurality of LEDs 42, 43. Further, the plurality of LEDs 42, 43 in FIG. 11d is shown connected electrically in parallel. In accordance to other embodiments, the plurality of LEDs 42, 43 may be connected electrically in series.

Figure 12:
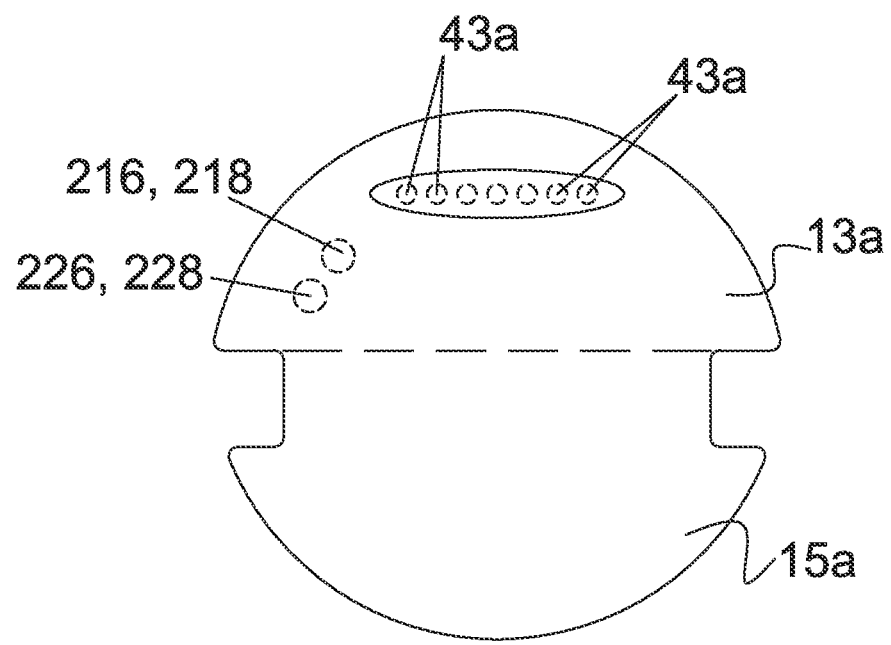
FIG. 12 is a top plan view of the plate of the decorative attachment, in accordance to another embodiment of the present invention.
Figure 13:
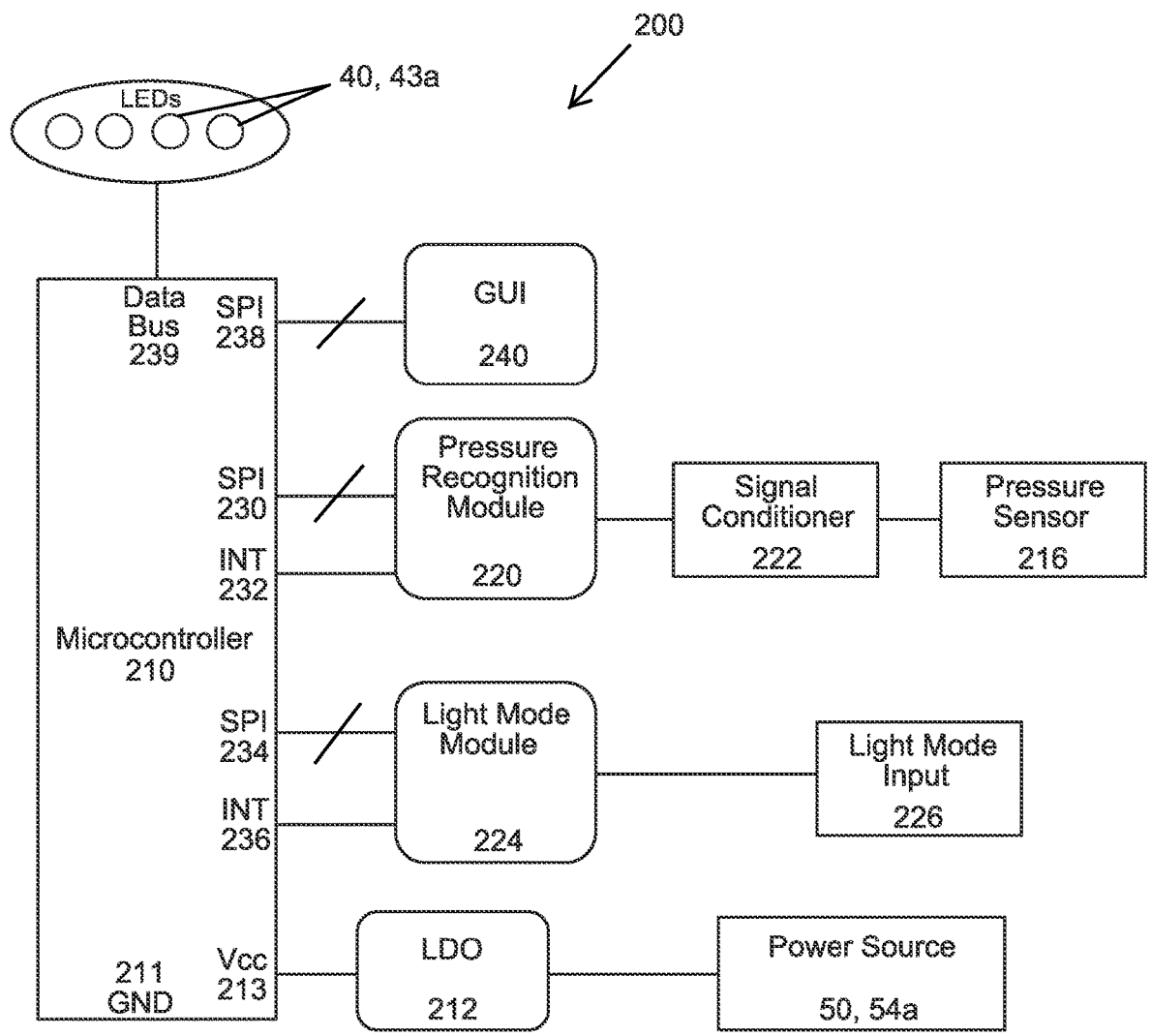
FIG. 13 is a schematic diagram of an exemplary electrical circuit used to activate the light source, in accordance to one embodiment of the present invention.

In accordance to another embodiment depicted in FIGS. 12-13, the lens 45 of each of the LEDs 43 may be manufactured and made commercially available in numerous colors and color combinations, thereby providing multicolored LEDs 43a. The LEDs 43a may be manufactured in a color or in color combinations selected from the group which includes, but is not limited to, white, silver, green, blue, purple, red, orange, pink, amber, yellow, or gold. The lens 45 of each of the LEDs 43a may be covered or encapsulated with a skin or covering 45a, wherein the covering 45a is transparent or translucent. Similar to the colored lens 45 described above, alternatively, the coverings 45a may be manufactured and made commercially available in numerous colors and color combinations, such as including, but not limited to, white, silver, green, blue, purple, red, orange, pink, amber, yellow, or gold.

Referring now more particularly to FIG. 13, a control circuit 200 adapted and configured for enabling the light source 40 (depicted therein as multicolored LEDs 43a) to produce illumination with varying illumination patterns is disclosed. For purposes of this disclosure, the terms "varying illumination patterns" means the multicolored LEDs 43a may be configured to blink, flash, fade, ebb, strobe, pulsate, and the like at various speeds and patterns. Operation of the control circuit 200 is controlled by a microcontroller 210. The control circuit 200 is powered via a power source 50 comprising one or more removable, and replaceable direct current (DC) batteries 51, such as a coin cell battery 52, or one or more removable and rechargeable batteries 54, such as a lithium-ion coin cell battery 54a. The power source 50 is coupled to a low-drop-out voltage regulator (LDO) 212, the voltage regulator 212 has a Vcc interface 213 to the microcontroller 210, and the microcontroller 210 is coupled to a ground GND at ground point 211. The microcontroller 210 controls the operation of control circuit 200 by managing a pressure recognition module 220, via a serial peripheral interface (SPI) 230 interface and a standard interface (INT) 232, the pressure recognition module 220 programmed to respond to commands from a pressure sensor 216. The pressure recognition module 220 is connected to a signal conditioner unit 222, the signal conditioner unit 222 is coupled to the pressure sensor 216, the pressure sensor 216 comprising a depressible button 218. Depression of the pressure sensor 216 powers on the control circuit 200 and microcontroller 210. The microcontroller 210 further controls a light mode module 224 via a serial peripheral interface (SPI) 234 interface and a standard interface (INT) 236, the light mode module 224 being programmed to respond to commands from a light mode input 226, the light mode input 226 comprising a depressible button 228. A plurality of varying illumination patterns is stored in the light mode module 224. To select a desired varying illumination pattern, the user depresses the light mode input 226 (depressible button 228) successively until a desired pattern is selected. After making the desired selection, user stops depressing the light mode input 226. The selected varying illumination pattern is identified by the light mode module 224 and transmitted as an instruction(s) of executable code to the microcontroller 210 which executes the instruction(s). A graphical user interface module (GUI) 240 is controlled by and connected to the microcontroller 210 via serial peripheral interface (SPI) 238. The GUI interface module 240 controls the varying illumination patterns presented by the multicolor LEDs 43a. The multicolored LEDs 43a are connected to the microcontroller 210 via a data bus interface 239. The data bus interface 239 facilitates data transfer between at least the pressure recognition module 220, the light mode module 224, the GUI interface module 240, and the microcontroller 210. The light source 40 and the control circuit 200 are powered off by depressing the pressure sensor 216. The pressure sensor 216 may also be adapted and configured to permit the illumination function of the illumination source 40 to power off automatically upon the expiration of a certain period of time after the pressure sensor 216 is depressed. The pressure sensor 216 identifies the interval of time during which the control circuit 200 has been activated and may actuate disengagement of the power supply to the control circuit 200 during an appreciable time.

Figure 14:
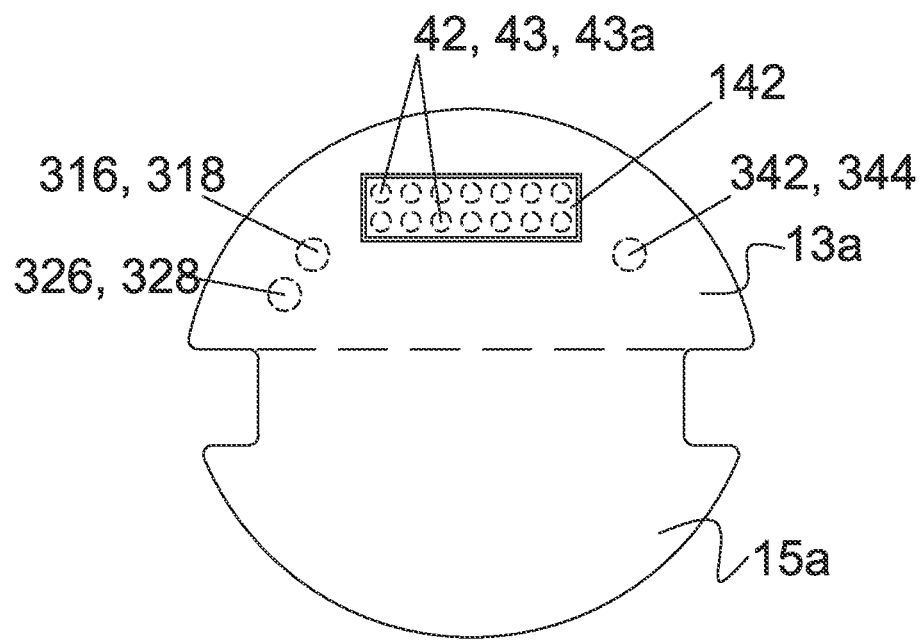
FIG. 14 is a top plan view of the plate shown supporting a display panel, in accordance to another embodiment of the present invention.
Figure 14A:
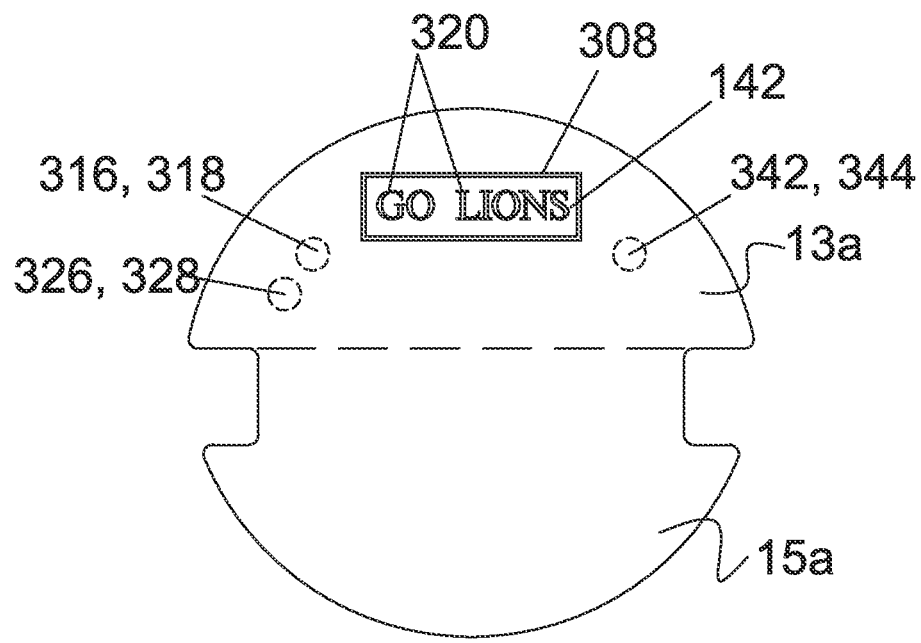
FIG. 14a is a top plan view of the plate of FIG. 14 showing a marquee displayed via the display panel.
Figure 14B:
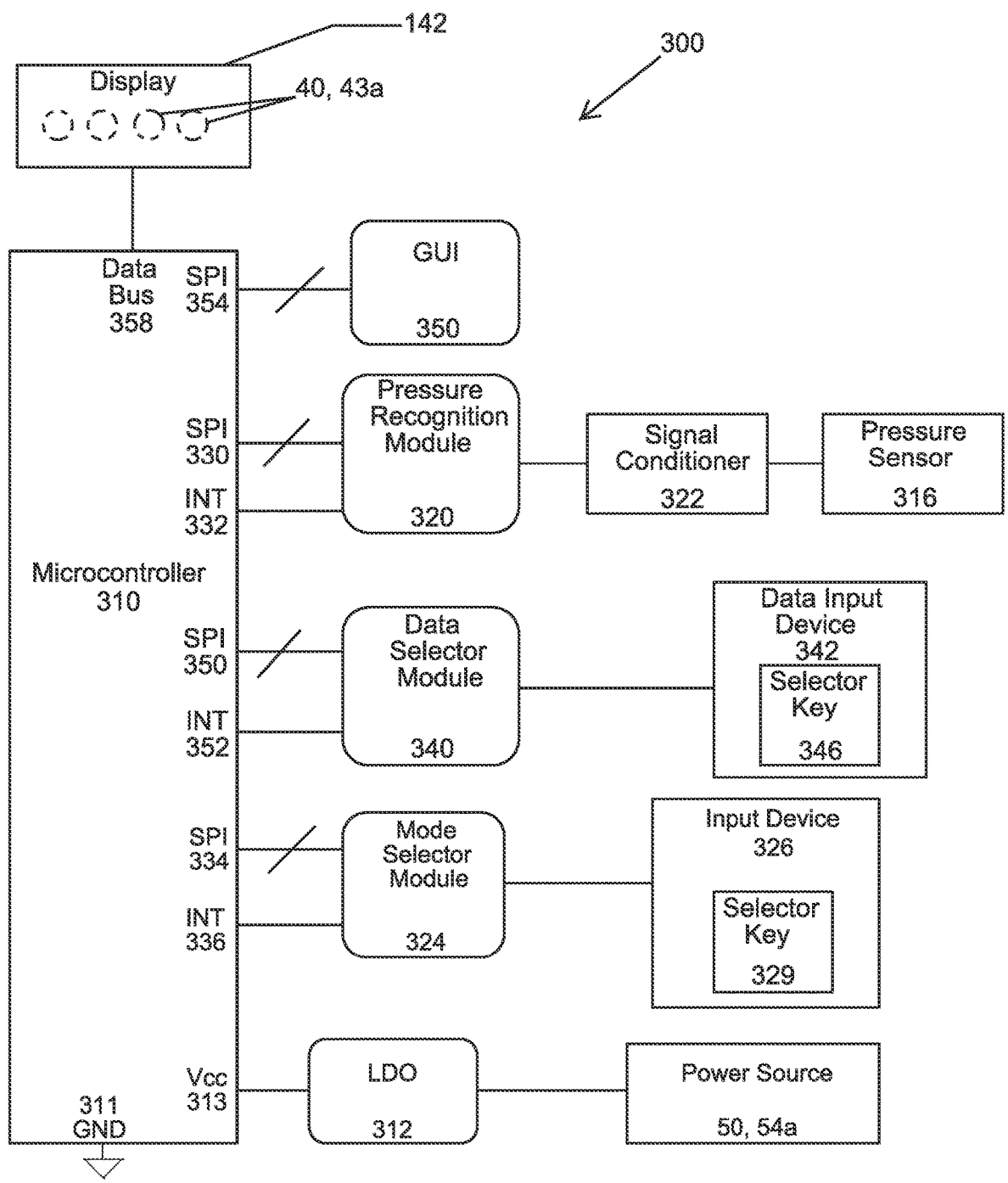
FIG. 14b is a schematic diagram of an exemplary electrical circuit used to activate an illuminated marquee, in accordance to another embodiment of the present invention.
Figure 14C:
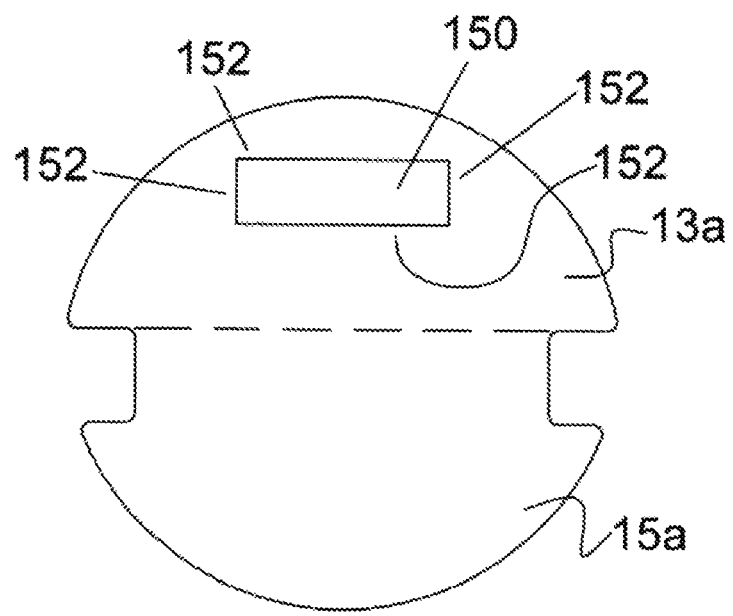
FIG. 14c is a top plan view of the plate showing the opening for supporting an illuminated display panel.

Referring now more particularly to FIGS. 14-14c, a control circuit 300 adapted and configured for enabling a marquee 308 to be presented via an illuminated display panel 142 is disclosed. The display panel 142 is suitably affixed superjacent the upper section of the obverse surface 13a of the first arcuate portion 13 so as to be visible from the obverse surface 13a. A rear portion of the display panel 142 extends through an opening 150 defined through the upper section of the first arcuate portion 13. A lower surface of the frame section 143 of the display panel 142 is engaged intimately against a continuous upper lip edge 152 of the opening 150. Thus, the display panel 142 extends through the opening defined through the upper section of the first arcuate portion 13 so as to be visible from the obverse surface 13a of the first arcuate portion 13, as shown in FIGS. 14 and 14a.

The marquee 308 comprises alphanumeric text, symbols, and punctuation marks (collectively, "alphanumeric data 320") which may be combined to form words and phrases. The alphanumeric data 320 may be displayed on the display panel 142 in a stationary, scrolling, or flashing fashion, and at various speeds. The display panel 142 is illuminated via a light source 40, the light source comprising LEDs 42. The LEDs 42 may comprise at least one of high-intensity white LEDs 43 and multicolored LEDs 43a. The display panel 142 may be a backlit display panel, wherein the light source 40 (e.g., LEDs 42) is positioned on a rear side of the display panel 142, thereby enabling the alphanumeric data 320 produced by the display panel 142 to appear sharper or more distinct in contrast to the background, and thus providing a display panel 142 being easier to read in low and no light conditions. Operation of the control circuit 300 is controlled by a microcontroller 310. The control circuit 300 is powered via a power source 50 comprising one or more removable, and replaceable direct current (DC) batteries 51, such as a coin cell battery 52, or one or more removable and rechargeable batteries 54, such as a lithium-ion coin cell battery 54a. The power source 50 is coupled to a low-drop-out voltage regulator (LDO) 312, the voltage regulator 312 has a Vcc interface 313 to the microcontroller 310, and the microcontroller 310 is coupled to a ground GND at ground point 311. The microcontroller 310 controls the operation of control circuit 300 by managing a pressure recognition module 320, via a serial peripheral interface (SPI) 330 interface and a standard interface (INT) 332, the pressure recognition module 320 programmed to respond to commands from a pressure sensor 316. The pressure recognition module 320 is connected to a signal conditioner unit 322, the signal conditioner unit 322 is coupled to the pressure sensor 316, the pressure sensor 316 comprising a depressible button 318. Depression of the pressure sensor 316 powers on the control circuit 300 and microcontroller 310. The microcontroller 310 further controls a mode selector module 324 via a serial peripheral interface (SPI) 334 interface and a standard interface (INT) 336, the mode selector module 324 being programmed to respond to commands from an input device 326, the input device 326 comprising a depressible button 328. Depression of the input device 326 (depressible button 328) transmits a command to the mode selector module 324 to present a list of marquee modes on the display panel 142. The mode selector module 324 executes the command or instructions and presents a list of selectable marquee modes on the display panel 142. Using a selector key 329 of the input device 326, user selects one of the marquee modes (e.g., stationary and scrolling) from the list of marquee modes, including speed thereof if applicable. In accordance to one exemplary embodiment, the user may use selector key 329 to move a selector bar through the list of marquee modes and the depressible button 328 to select the desired marquee mode, e.g., the marquee mode highlighted by the selector key 329.

The microcontroller 310 still further controls a data selector module 340 via a serial peripheral interface (SPI) 350 interface and a standard interface (INT) 352, the data selector module 340 being programmed to respond to commands from a data input device 342, the data input device 342 comprising a depressible button 344. Depression of the data input device 342 (depressible button 344) transmits a command to the data selector module 340 to present a plurality of alphanumeric data 320 on the display panel 142. Therefore, after selecting the desired marquee mode, user depresses the data input device 342 transmitting a command or instructions to the data selector module 340 which executes the command or instructions and presents a plurality of selectable alphanumeric data 320 on the display panel 142. Using a selector key 346 of the data input device 342, user selects one of the characters of the alphanumeric data 320 (e.g., the letter "G") from the plurality of selectable alphanumeric data 320. In accordance to one exemplary embodiment, the user may use selector key 346 to move a selector bar through the plurality of selectable alphanumeric data 320 and pressing the depressible button 344 once to select the desired character, e.g., the desired character highlighted by the selector key 346, and again the data selector module 340 presents a plurality of selectable alphanumeric data 320 on the display panel 142 from which user may select a character therefrom. Once user has completed all alphanumeric data 320 selections, user presses the depressible button 344 twice, setting the desired marquee 308.

The marquee 308 setting is identified by the data selector module 340 and transmitted as an instruction(s) of executable code to the microcontroller 310 which executes the instruction(s). A graphical user interface module (GUI) 350 is controlled by and connected to the microcontroller 310 via serial peripheral interface (SPI) 354. The GUI interface module 350 controls the selected marquee mode and alphanumeric data 320 displayed by the display panel 142. The display panel 142 is connected to the microcontroller 310 via a data bus interface 358. The data bus interface 358 facilitates data transfer between at least the pressure recognition module 320, the mode selector module 324, the data selector module 340, the GUI interface module 350, and the microcontroller 310. The light source 40 and the control circuit 300 are powered off by depressing the pressure sensor 316.

Figure 15:
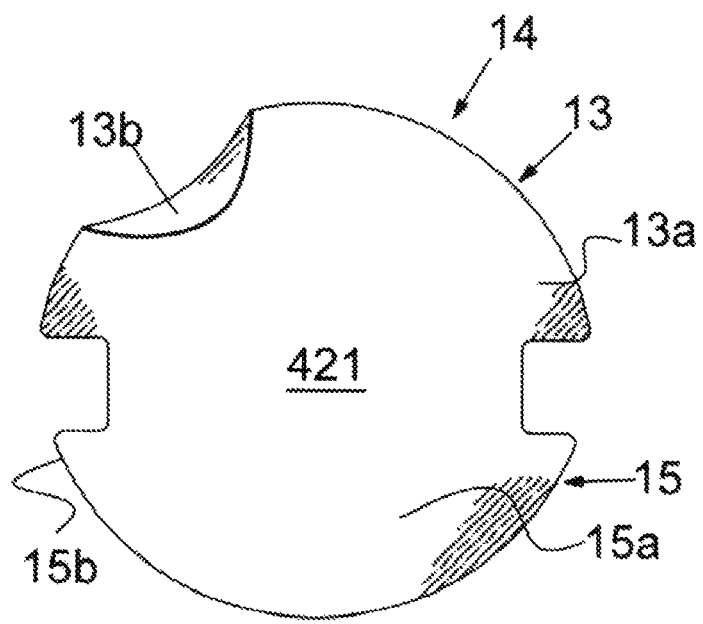
FIG. 15 is a top plan view of a plate illustrating a carrier surface on which a fiber-optic illuminated, animated display is presented, in accordance to another embodiment of the present invention.
Figure 15A:
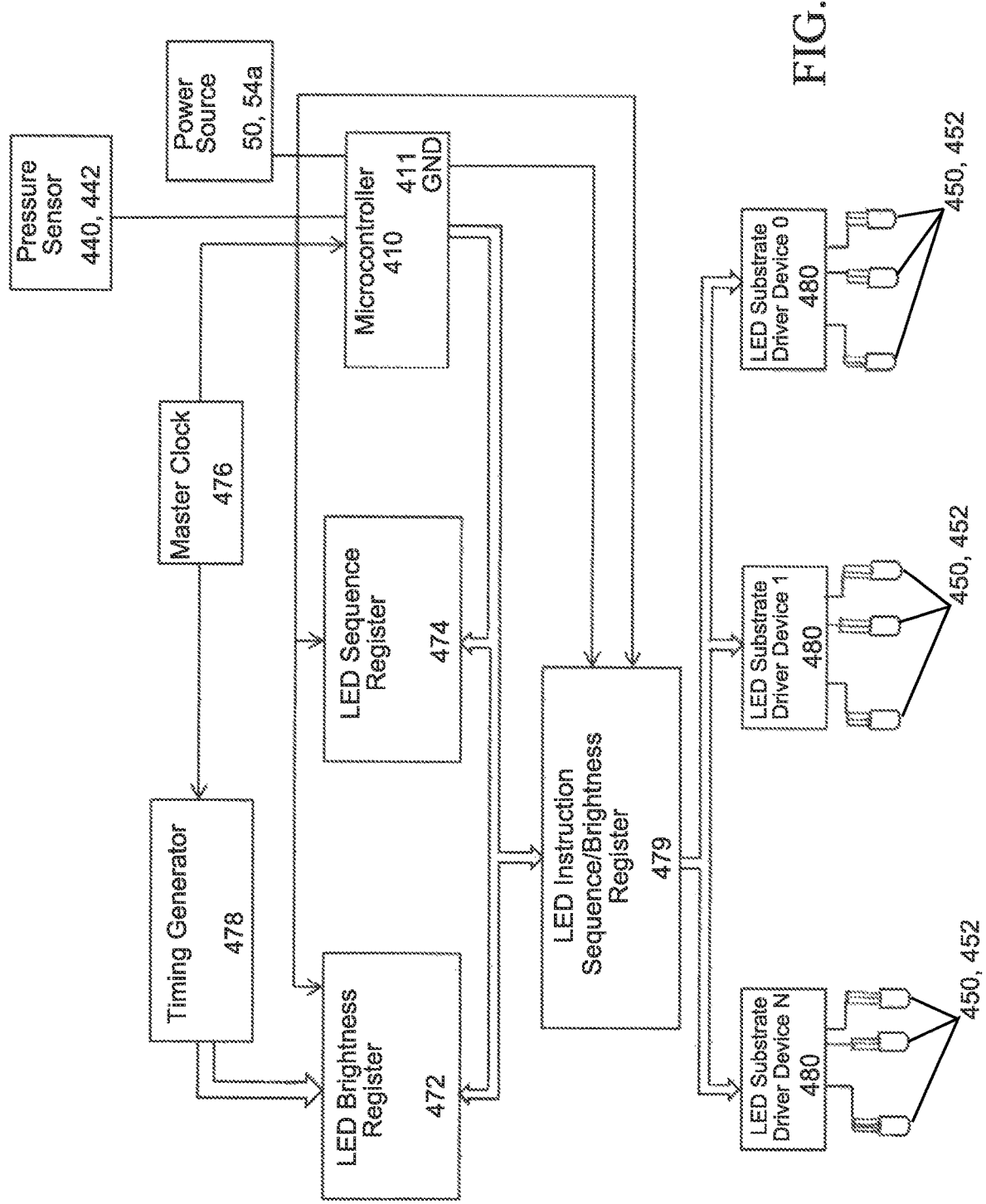
FIG. 15a is an exemplary block diagram showing an electronic control circuit configuration for imparting an illuminated, animated display on a planar surface, in accordance to another embodiment of the present invention.
Figure 15B:
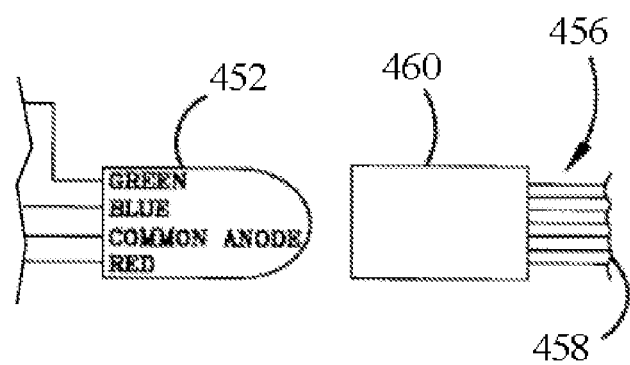
FIG. 15b is a partial side elevational view of a connector for operatively connecting an LED to a bundle of optical fibers.
Figure 15C:
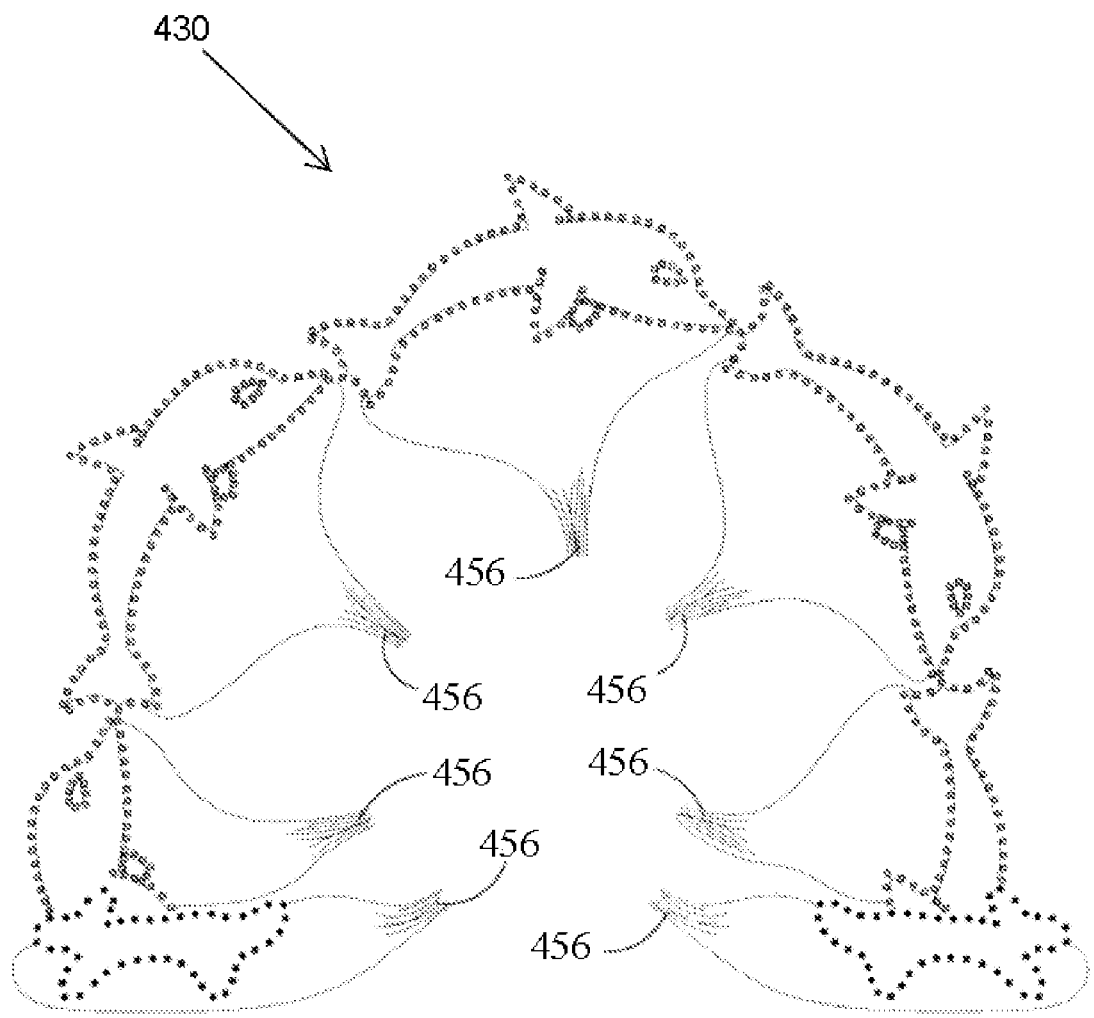
FIG. 15c illustrates a sequential animation of a jumping dolphin using a plurality of fiber optic bundles.
Figure 15D:
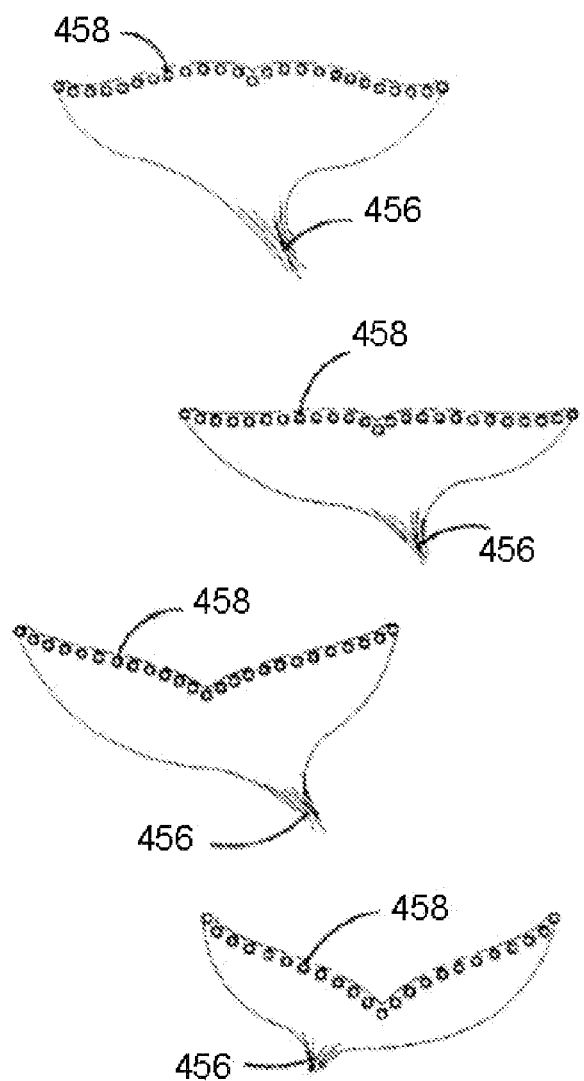
FIG. 15d illustrates a sequential animation of a flying bird using a plurality of fiber optic bundles.

In reference to FIGS. 15-15d, the obverse surface 13a of the first arcuate portion 13 and/or the obverse surface 15a of the second arcuate portion 15 of the planar body 14 provides a carrier 421 on which a fiber-optic illuminated, animated display 430 is presented. The reverse surface 13b of the first arcuate portion 13 and/or the reverse surface 15b of the second arcuate portion 15 of the planar body 14 may also provide a carrier 421 on which a fiber-optic illuminated, animated display 430 may be presented. The carrier 421 (planar body 14) may be constructed of a fabric, cardboard, or other flexible or semi-rigid material suitable for carrying the illuminated, animated display 430.

Figure 15E:
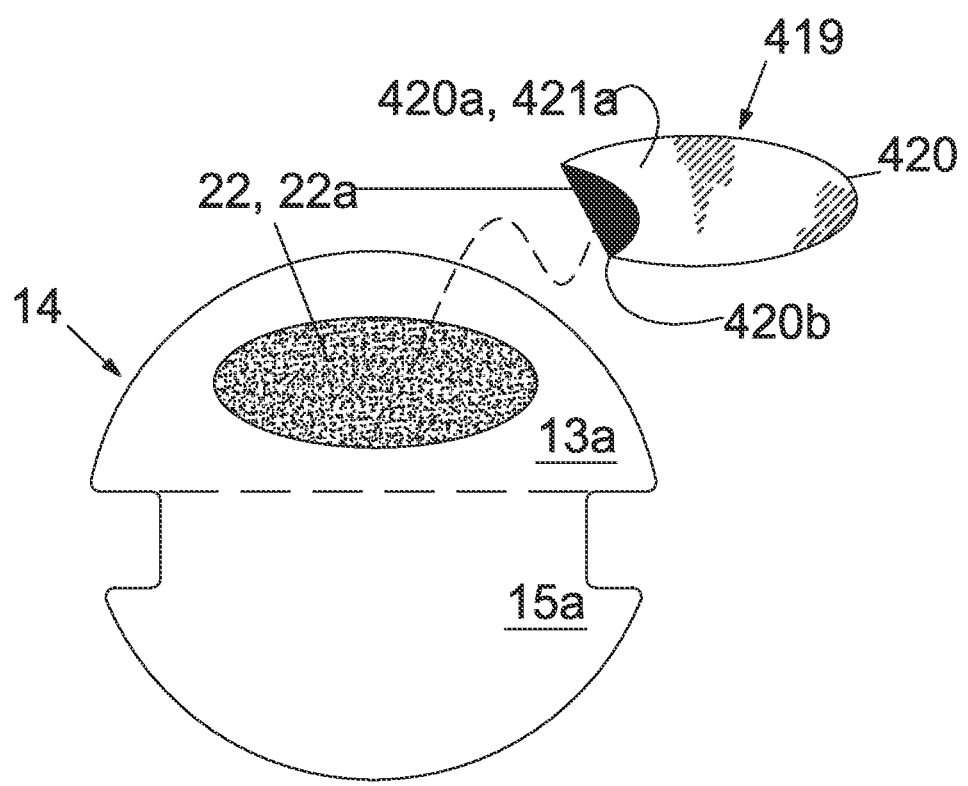
FIG. 15e is an exploded view showing an animated display patch removably coupled to the obverse surface of the first arcuate portion of the planar body of the plate, in accordance to yet another embodiment of the present invention.

Referring now more particularly to FIG. 15e, in accordance to another embodiment, an illuminated, animated display patch 419 is disclosed. The display patch 419 comprises a flexible, or semi-rigid planar body 420 and includes an obverse surface 420a and a reverse surface 420b. In accordance to one embodiment, the display patch 419 is removably attachable to the obverse surface 13a of the first arcuate portion 13 and/or the obverse surface 15a of the second arcuate portion 15a of the planar body 14 of the plate 12. Removable attachment of the display patch 419 to at least one of the obverse surface 13a of the first arcuate portion 13 and the obverse surface 15a of the second arcuate portion 15a of the planar body 14 is accomplished via the fastening means 22, such as a hook-and-loop fastener material 22a. The reverse surface 420b of planar body 420 comprises a complementary fastening portion 22a for mutual cooperation with fastening means 22, 22a affixed to the obverse surface 13a of the first arcuate portion 13 and/or the obverse surface 15a of the second arcuate portion 15a to facilitate mutual coupling of the display patch 419 to the obverse surface 13a of the first arcuate portion 13 and/or the obverse surface 15a of the second arcuate portion 15a of the planar body 14 of the plate 12.

In accordance to another embodiment, the planar body 420 may be permanently affixed to the obverse surface 13a of the first arcuate portion 13 and/or the obverse surface 15a of the second arcuate portion 15a of the planar body 14 of the plate 12 via a suitable attachment means, such as including, but not limited to, sewing, and an adhesive.

The obverse surface 420a of the display patch 419 provides a carrier 421a on which a fiber-optic illuminated, animated display 430 is presented. The carrier 421a (planar body 420) may be constructed of a fabric, cardboard, or other flexible or semi-rigid material suitable for carrying the illuminated, animated display 430.

Referring now to FIGS. 15-15e, and more particularly to FIGS. 15a and 15b, an electronic control circuit 400 adapted for generating the fiber-optic illuminated, animated display 430 is powered via a power source 50 comprising one or more removable, and replaceable direct current (DC) batteries 51, such as a coin cell battery 52, or one or more removable and rechargeable batteries 54, such as a lithium-ion coin cell battery 54a. Operation of the electronic control circuit 400 is controlled by a microcontroller 410. The power source 50 is interfaced to the microcontroller 410, and the microcontroller 410 is coupled to a ground GND at ground point 411. Power to the electronic control circuit 400 and the microcontroller 410 is activated via depression of a pressure sensor 440 interfaced to the microcontroller 410, wherein the pressure sensor 440 comprises a depressible button 442. A subsequent or second depression of the pressure sensor 440 (depressible button 442) deactivates or powers off the electronic control circuit 400 and microcontroller 410, thereby deactivating light source 450 and deactivating the illuminated, animated display 430. The animated display 430 is illuminated via the light source 450 comprising at least one LED and preferably a plurality of LEDs 452, wherein each LED being operatively connected to a bundle 456 of optical fibers 458 by a connector 460 enabling color emitted from each of the LEDs 452 to be transmitted through the optical fibers 458 of the respective bundle 456.

In accordance with one embodiment, a program sequence control system 470 comprises an addressable LED brightness register 472, an addressable LED sequence register 474, a master clock 476, a timing generator 478, and the microcontroller 410. The microcontroller 410 selectively addresses the LED brightness and sequence registers 472, 474 in accordance with synchronizing clock pulses from the master clock 475 providing predetermined information concerning the order or sequence, the selection and the brightness of any number of substrates of associated illumination devices or LEDs 452. The microcontroller 410 and timing generator 478 cooperate to provide a series or pattern of pulse rates (duty cycle) selected brightness level to the selected LED substrate drivers 480 through an LED instruction sequence/brightness register 479, in synchronous timing afforded by the master clock 475. The LED instruction sequence/brightness register 479 alternatively passes information related to the selected LED 452 and color and pulse rate (duty cycle) for color selection, brightness of color or color mix and length of "on" time. All information is pre-stored in memory in the microcontroller 410 with the LED control timing signals applied to the LED instruction sequence/brightness register 479 to appropriately control the transfer of the alternating information. Digital-to-analog converters and associated LED substrate drivers 480 capture and decode the digital pulses sequentially transmitted thereto and emit pulsed voltages along appropriate predetermined signal lines to selectively turn on the desired red, green and blue substrates of the LEDs 452, thereby emitting the corresponding selected colors from the LEDs 452 and illuminating the desired ones of the optical fibers 458 with the selected colors. This operation continues through an entire pre-determined order or sequence of changing illumination (or animation) of patterns of optical fibers 458 disposed on the carrier 421, 421*a* including color variations, until an illumination sequence is completed and, unless the power source is turned off, the illumination sequence will continue to repeat.

The timed sequencing of the bundles of optical fibers arrayed in specific patterns produce a plurality of sub-frame images on the carrier 421, 421*a* surface imparting animated images such as including, but not limited to, for example, a dolphin leaping out of and diving back into water depicted in FIG. 15*c*, and a flying bird depicted in FIG. 15*d*.

Those skilled in the art will appreciate that certain variations of this invention may include certain components not shown and may omit one or more components which are shown in comparable embodiments but with the same general purpose sought by the invention. The microcontroller 210, 310, 410 is envisioned to be based on an 8-bit, low energy, high performance component that runs at 48 MHz with 64 KB of flash memory and 4 KB of RAM with ports necessary to communicate with the sensors and other control modules.

Although an exemplary embodiment of the system, method, and device of the present invention has been illustrated in the accompanied drawings and described in the foregoing detailed description, it will be understood that the invention is not limited to the embodiments disclosed, but is capable of numerous rearrangements, modifications, and substitutions without departing from the spirit or scope of the invention as set forth and defined by the following claims. For example, the capabilities of the system can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules. Also, the messages sent or received by any of the modules may be sent or received directly and/or via one or more of the other modules.

Presenting the above-described functions as being performed by a "system" is not intended to limit the scope of the present invention in any way, but is intended to provide one example of many embodiments of the present invention. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, as electronic signals.

It is to be understood that the embodiments and claims are not limited in application to the details of construction and arrangement of the components set forth in the description and/or illustrated in drawings. Rather, the description and/or the drawings provide examples of the embodiments envisioned, but the claims are not limited to any particular embodiment or a preferred embodiment disclosed and/or identified in the specification. Any drawing figures that may be provided are for illustrative purposes only, and merely provide practical examples of the invention disclosed herein. Therefore, any drawing figures provided should not be viewed as restricting the scope of the claims to what is depicted.

The embodiments and claims disclosed herein are further capable of other embodiments and of being practiced and carried out in various ways, including various combinations and sub-combinations of the features described above but that may not have been explicitly disclosed in specific combinations and sub-combinations.

Accordingly, those skilled in the art will appreciate that the conception upon which the embodiments and claims are based may be readily utilized as a basis for the design of other structures, methods, and systems. In addition, it is to be understood that the phraseology and terminology employed herein are for the purposes of description and should not be regarded as limiting the claims.

What is claimed is:

1. An attachment for caps, the attachment comprises:
    a plate comprising a planar body, the body comprising a first arcuate portion and a second arcuate, the first arcuate portion having an obverse surface opposing a reverse surface, and the second arcuate portion having an obverse surface and reverse surface, wherein the first and second arcuate portions are integrally coupled via an interface, the interface defining a fold line for folding the first and second arcuate portions to an appositional orientation; and
    a coupling means disposed on the reverse surface of the first arcuate portion and the reverse surface of the second arcuate portion, the coupling means mutually coupling the first arcuate portion and the second arcuate portion appositionally along the reverse surfaces thereof in a detachably secured manner; wherein the fold line is aligned with a headband size-regulator strap of a cap, the fold line configured for folding the first arcuate portion and the second arcuate portion about the headband size-regulator strap and mutually coupling the reverse surface of the first arcuate portion with the reverse surface of the second arcuate surface.

2. The attachment of claim 1, further comprising indicia on the obverse surface of the first arcuate portion.

3. The attachment of claim 2, wherein the indicia is integral to the obverse surface of the first arcuate portion.

4. The attachment of claim 2, wherein the indicia is removably coupled to the obverse surface of the first arcuate portion.

5. The attachment of claim 2, wherein the indicia is integral to the obverse surface of the second arcuate portion.

6. The attachment of claim 2, wherein the indicia is removably coupled to the obverse surface of the second arcuate portion.

7. The attachment of claim 1, further comprising indicia on the obverse surface of the second arcuate portion.

8. The attachment of claim 1, wherein coupling means comprises apparel fasteners.

9. The attachment of claim 8, wherein the apparel fasteners comprise hook-and-loop fastener material.

10. An attachment for caps, the attachment comprises:
a plate comprising a planar body, the body comprising a first arcuate portion and a second arcuate, the first arcuate portion having an obverse surface opposing a reverse surface, and the second arcuate portion having an obverse surface and reverse surface, wherein the first and second arcuate portions are integrally coupled via an interface, the interface defining a fold line for folding the first and second arcuate portions to an appositional orientation;
a coupling means disposed on the reverse surface of the first arcuate portion and the reverse surface of the second arcuate portion, the coupling means mutually coupling the first arcuate portion and the second arcuate portion appositionally along the reverse surfaces thereof in a detachably secured manner, and wherein the fold line is aligned with a headband size-regulator strap of a cap, the fold line configured for folding the first arcuate portion and the second arcuate portion about the headband size-regulator strap and mutually coupling the reverse surface of the first arcuate portion with the reverse surface of the second arcuate surface;
a plate cover comprising an interchangeable, decorative planar body, the planar body comprising an arcuate or semicircular configuration having an obverse surface and a reverse surface, the obverse surface of the planar body is embellished with indicia; and
a fastening means, the fastening means removably couples the planar body to the obverse surface of the first arcuate portion or the obverse surface of the second arcuate portion.

11. The attachment of claim 10, wherein the coupling means comprises an apparel fastener.

12. The attachment of claim 11, wherein the apparel fastener comprises hook-and-loop material.

13. The attachment of claim 10, wherein the fastening means comprises apparel fasteners.

14. The attachment of claim 13, wherein the apparel fasteners comprise hook-and-loop material.

15. The attachment of claim 10, wherein the plate cover comprises a light reflective material forming a light reflective patch.

16. The attachment of claim 10, wherein the plate further comprises a light source disposed along an upper section of the reverse surface of the first arcuate portion of the planar body, the light source comprising a lens portion extending perpendicularly through a lens receiving aperture defined through the upper section of the first arcuate portion of the planar body so as to be visible from the obverse surface of the first arcuate portion, the light source projecting narrow beams of light forwardly and distally from an upper section of the obverse surface of the first arcuate portion of the planar body.

17. The attachment of claim 10, further comprising a control circuit enabling a light source to produce illumination with varying illumination patterns.

18. The attachment of claim 17, wherein the light source comprises multicolored LEDs.

19. The attachment of claim 10, further comprising:
an illuminated display panel suitably affixed superjacent an upper section of the obverse surface of the first arcuate portion so as to be visible from the obverse surface; and
a control circuit enabling a marquee to be presented via the illuminated display panel.

20. An attachment for caps, the attachment comprises:
a plate comprising a planar body, the body comprising a first arcuate portion and a second arcuate, the first arcuate portion having an obverse surface opposing a reverse surface, and the second arcuate portion having an obverse surface and reverse surface, wherein the first and second arcuate portions are integrally coupled via an interface, the interface defining a fold line for folding the first and second arcuate portions to an appositional orientation;
a coupling means disposed on the reverse surface of the first arcuate portion and the reverse surface of the second arcuate portion, the coupling means mutually coupling the first arcuate portion and the second arcuate portion appositionally along the reverse surfaces thereof in a detachably secured manner, and wherein the fold line is aligned with a headband size-regulator strap of a cap, the fold line configured for folding the first arcuate portion and the second arcuate portion about the headband size-regulator strap and mutually coupling the reverse surface of the first arcuate portion with the reverse surface of the second arcuate surface; and
an electronic control circuit enabled to generate a fiber-optic illuminated, animated display, wherein at least one of the reverse surface of the first arcuate portion and the reverse surface of the second arcuate portion of the planar body comprises a carrier on which the fiber-optic illuminated, animated display is presented.

* * * * *